United States Patent
Cracco

(10) Patent No.: US 9,071,027 B2
(45) Date of Patent: Jun. 30, 2015

(54) COMMAND INVERTER FOR A BICYCLE GEARSHIFT CONTROL DEVICE

(71) Applicant: Campagnolo S.r.l., Vicenza (IT)

(72) Inventor: Flavio Cracco, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 191 days.

(21) Appl. No.: 13/948,802

(22) Filed: Jul. 23, 2013

(65) Prior Publication Data

US 2014/0030929 A1    Jan. 30, 2014

(30) Foreign Application Priority Data

Jul. 23, 2012  (IT) ............................... MI2012A1280

(51) Int. Cl.
| | |
|---|---|
| *H01R 29/00* | (2006.01) |
| *B62M 25/08* | (2006.01) |
| *B62J 6/18* | (2006.01) |
| *B62M 25/02* | (2006.01) |

(52) U.S. Cl.
CPC ............... *H01R 29/00* (2013.01); *B62M 25/02* (2013.01); *B62M 25/08* (2013.01); *B62J 6/18* (2013.01)

(58) Field of Classification Search
CPC ............ B62M 25/08; B62J 6/18; H01R 29/00
USPC .................................................. 439/188, 638
See application file for complete search history.

(56) References Cited

U.S. PATENT DOCUMENTS

| | | | | |
|---|---|---|---|---|
| 2,847,878 | A | * | 8/1958 | Scanlan ......................... 475/182 |
| 5,626,479 | A | * | 5/1997 | Hughes ........................... 439/35 |
| 5,766,020 | A | * | 6/1998 | Hughes ........................... 439/35 |
| 5,900,705 | A | * | 5/1999 | Kimura .......................... 318/286 |
| 5,993,262 | A | * | 11/1999 | Kowdynski et al. ........... 439/638 |
| 2006/0063434 | A1 | * | 3/2006 | Bergmann et al. ............. 439/638 |
| 2008/0156564 | A1 | * | 7/2008 | Driessen ........................ 180/220 |
| 2012/0316710 | A1 | * | 12/2012 | Saida .............................. 701/22 |
| 2012/0322591 | A1 | * | 12/2012 | Kitamura et al. ............... 474/80 |
| 2013/0267376 | A1 | * | 10/2013 | Takachi ............................ 477/3 |

FOREIGN PATENT DOCUMENTS

| | | |
|---|---|---|
| EP | 0543453 A1 | 5/1993 |
| EP | 1276192 A1 | 1/2003 |
| EP | 2011731 A1 | 1/2009 |
| JP | 8236217 A | 9/1996 |

OTHER PUBLICATIONS

Italian Search Report and Written Opinion in Italian Application No. IT MI2012001280, Apr. 12, 2013 with English translation.

* cited by examiner

*Primary Examiner* — Briggitte R Hammond
(74) *Attorney, Agent, or Firm* — Volpe and Koenig, P.C.

(57) ABSTRACT

A command inverter for at least one bicycle gearshift control device. The inverter has a first interface with an electronic gearshifting control unit that includes a first plurality of electrical terminations; and, a second interface that includes a second plurality of electrical terminations; wherein at least one electrical termination of the first interface is not electrically connected to an electrical termination of the second interface.

14 Claims, 8 Drawing Sheets

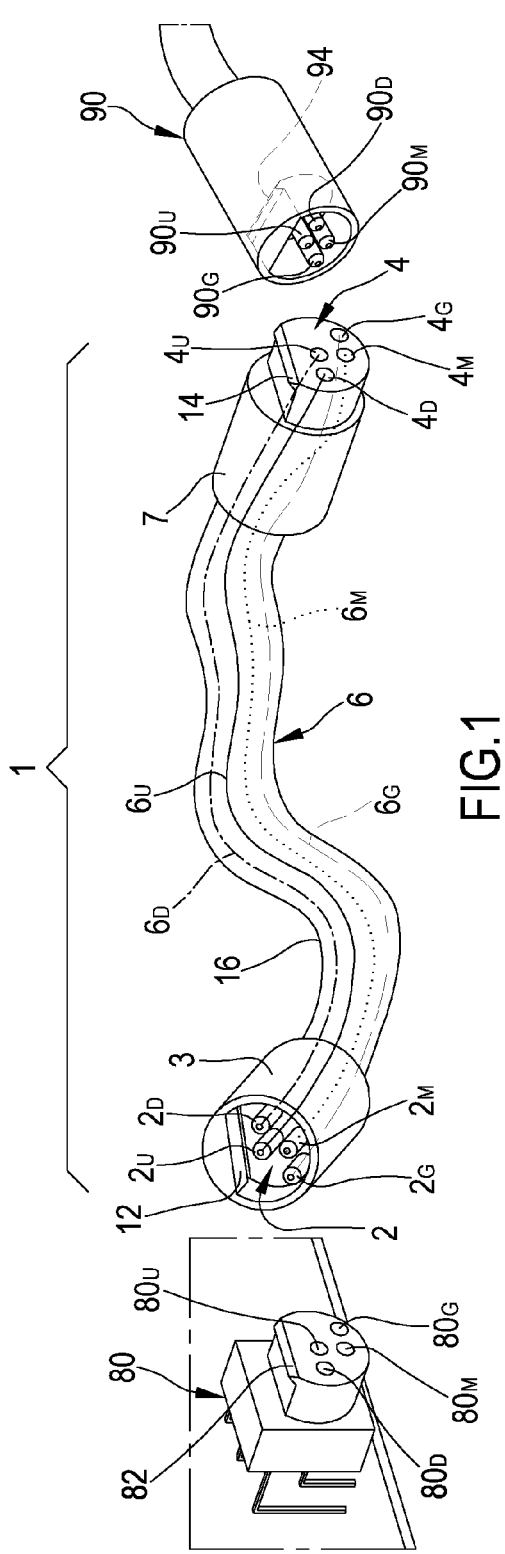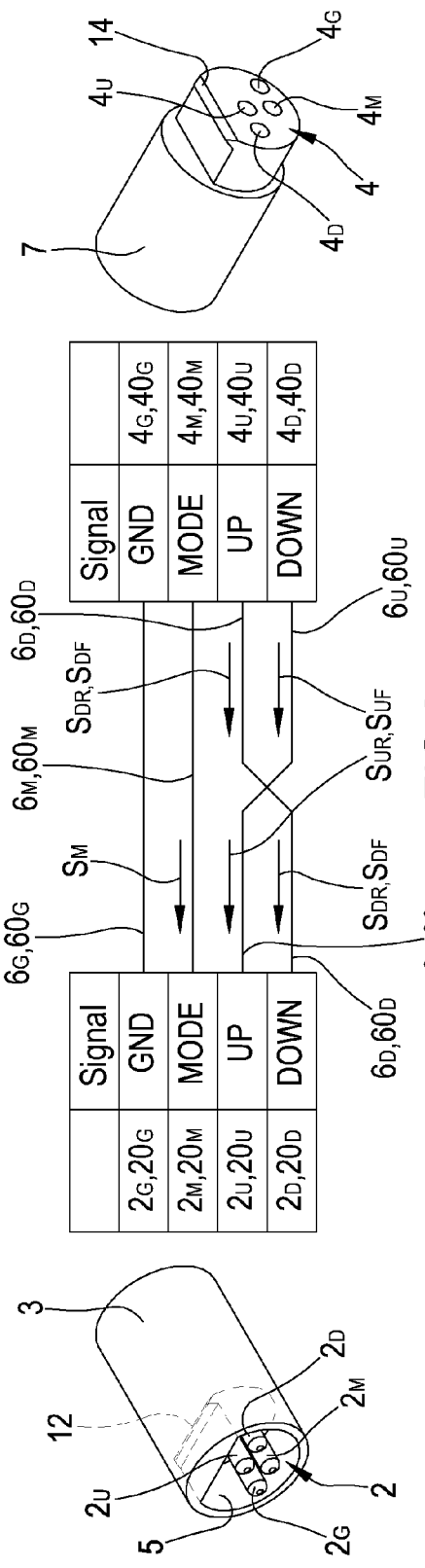

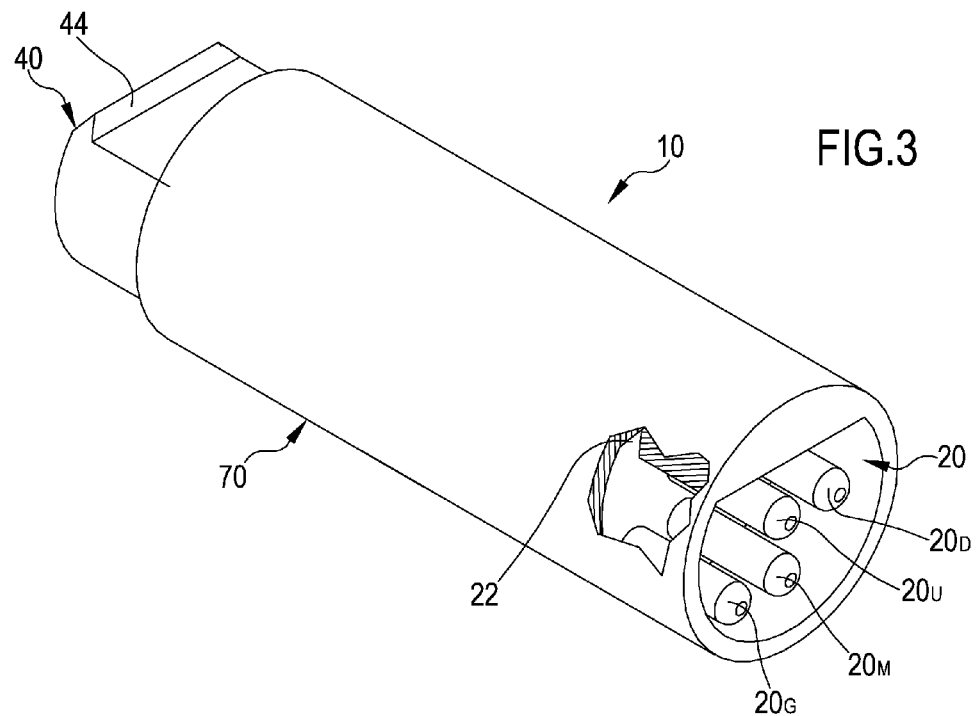
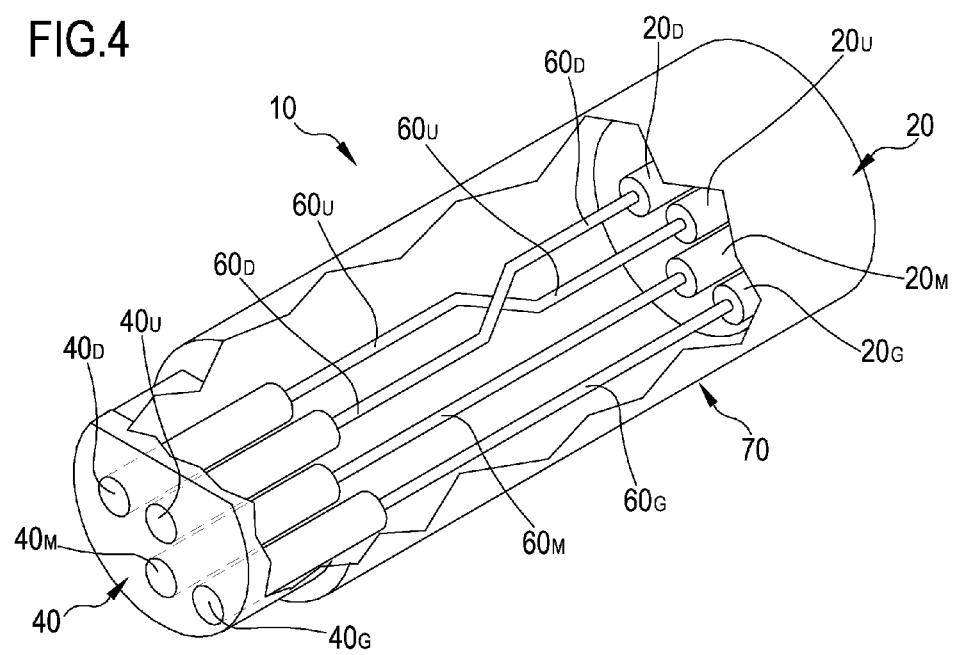

COMMAND INVERTER FOR A BICYCLE GEARSHIFT CONTROL DEVICE

FIELD OF INVENTION

The present invention refers, in general, to the technical field of manual bicycle gearshift control devices. More specifically, the present invention refers to a command inverter for a manual bicycle gearshift control device of the bar-end type.

BACKGROUND

A motion transmission system in a bicycle comprises a chain extended between toothed wheels associated with the axle of the pedal cranks and with the hub of the rear wheel. When there is more than one toothed wheel at at least one between the axle of the pedal cranks and the hub of the rear wheel, and the motion transmission system is therefore equipped with a gearshift, a front derailleur and/or a rear derailleur is provided. In the case of an electronically servo-assisted gearshift, each derailleur comprises a chain guide element, also known as cage plate, which is movable to move the chain between the toothed wheels in order to vary the transmission ratio, and an electromechanical actuator to move the chain guide element. Typically, the actuator in turn comprises a motor, typically an electric motor, coupled with the chain guide element by means of a linkage such as an articulated parallelogram, a rack system or a worm screw system, as well as a position, speed and/or acceleration sensor of the rotor or of any mobile part downstream of the rotor, up to the chain guide element itself. It is worth emphasising that slightly different terminology from that used in this context is also in use.

A control electronics varies the transmission ratio based on commands manually entered by the cyclist by mean of suitable control devices, for example a lever and/or buttons and/or based on automatically entered commands or, as far as the invention is concerned, semi-automatically entered commands. In case of automatically or semi-automatically entered commands, the control electronics establishes—typically based on the outputs of sensors of the travel parameters—such as the travel speed, the rotation speed of the pedal cranks, the slope of the travel ground, the heart rate of the cyclist and similar—when it is suitable to change transmission ratio and automatically generates signals requesting movement of the derailleur (automatic operation) or performs a supervision/integration of the cyclist's requests, preventing them, bypassing them, delaying them and/or integrating them with automatically generated requests, or vice-versa proposing such requests to the cyclist that in any case has the option of bypassing them (semi-automatic operation).

It is well known that for bicycles intended for racing there is a constant search for solutions to improve performance. In particular, for bicycles intended for speed races, such as typically time trials, a good aerodynamic configuration of all of the bicycle components is particularly important. Moreover, a factor for improving performance is considered to be the efficiency of all of the controls, but also how safe and easy they are to actuate, in that the cyclist is able to concentrate on the physical effort without obstacles due to difficulties in actuating the controls.

Recently, specialised handlebars for speed races have become popular, which have two or four bars or ends facing markedly forwards, which allow the cyclist to maintain a position of the torso greatly inclined forwards, which is aerodynamically efficient.

With these handlebars, specific control devices have also become well-established, both for the brakes and for the gearshift; these devices are commonly called bar-end devices since they are housed right at the ends of the handlebars, so that the cyclist can actuate them easily without having to change his position.

As mentioned before, manual bicycle gearshift control devices of the bar-end types comprise lever control devices and button control devices.

A lever-operated manual control device of the bar-end type comprises an assembly portion suitable for being mounted at the end of a handlebars facing forwards in the travel direction of the bicycle, a control lever projecting forwards from the assembly portion of the manual control device in the travel direction of the bicycle and means for imparting at least one control signal, typically comprising a pair of switches actuated by the lever. The control signals are transmitted to an electronic gearshifting control unit through a multiconductor cable.

Typically, the lever is angularly mobile with respect to the assembly portion between an intermediate neutral position, in which no gearshifting is commanded, and two operative positions, typically a raised operative position, in which an upward gearshifting is commanded, i.e. a movement of the chain, carried out by the rear or front derailleur, respectively, onto a toothed wheel of greater diameter with respect to the one currently engaged by the chain, and a lowered operative position, in which a downward gearshifting is commanded, i.e. a movement of the chain, carried out by the rear or front derailleur, respectively, onto a toothed wheel of smaller diameter with respect to the one currently engaged by the chain.

A button-operated manual control device of the bar-end type comprises an assembly portion suitable for being mounted at the end of the handlebars, a pair of buttons projecting from the assembly portion and means for imparting an electrical control signal, typically comprising a pair of switches actuated by the buttons. Also in this case, signals are transmitted to an electronic gearshifting control unit through a multiconductor cable. In particular, by acting on the upper button, the cyclist commands an upward gearshifting and by acting on the side button he commands a downward gearshifting.

It is also possible to use the lever/button to impart a command to change a transmission ratio, the electronic control unit providing for transforming the command into a gearshifting command of the rear and/or front derailleur.

Both with the lever-operated manual control device and with the button-operated manual control device, the electronic gearshifting control unit comprises an interface, in electrical connection with the switches of the control devices mounted on the right and left of the handlebars, and a power system in electrical connection with the interface. The interface is suitable for receiving, through the multiconductor cable, upward and downward gearshifting control signals imparted by the switches of the pair of gearshift control devices and for transmitting them to the power system that, as a function of the gearshifting control signal received, actuates the respective actuator of the rear and/or front wheel, so as to move the motion transmission chain on the toothed wheels associated with the axle of the pedal cranks and with the hub of the rear wheel, so as to establish the transmission ratio selected by the cyclist, thus carrying out the gearshifting.

Both with the lever-operated manual control device and with the button-operated manual control device it is possible to provide other switches, for example a switch for a so-called MODE command, operated by a lever or by a button, for selecting an operating mode selected from normal travel, setting of gearshift parameters etc., and/or a switch for a so-called SET command, for selecting a value of the selected gearshift parameters.

In the typical configuration (hereafter "standard") of a handlebars equipped with manual bicycle gearshift control devices of the bar-end type, the right device controls upward and downward gearshifting in the rear derailleur, whereas the left device controls upward and downward gearshifting in the front derailleur.

If a cyclist wishes to perform an upward gearshifting of the rear derailleur, he must lift the lever, or correspondingly press the upper button, of the manual gearshift control device mounted on the right of the handlebars, thus activating the respective switch. An upward gearshifting signal of the rear derailleur is thus generated, which is transmitted, through the multi-conductor cable, to the interface and from this to the power system of the electronic gearshifting control unit. The power system, in turn, actuates the actuator of the rear derailleur so as to move the chain onto a toothed wheel of greater diameter among the toothed wheels associated with the hub of the rear wheel.

Differently, if a cyclist wishes to perform a downward gearshifting of the rear derailleur, he must lower the lever, or correspondingly press the side button, of the manual gearshift control device mounted on the right of the handlebars, thus activating the respective switch. A downward gearshifting signal of the rear derailleur is thus generated, which is transmitted, through the multi-conductor cable, to the interface and from this to the power system of the electronic gearshifting control unit. The power system, in turn, actuates the actuator of the rear derailleur so as to move the chain onto a toothed wheel of smaller diameter.

Similarly, if a cyclist wishes to perform an upward gearshifting of the front derailleur, he must lift the lever, or correspondingly press the upper button, of the manual gearshift control device mounted on the left of the handlebars, thus activating the respective switch. An upward gearshifting signal of the front derailleur is thus generated, which is transmitted, through the multi-conductor cable, to the interface and from this to the power system of the electronic gearshifting control unit. The power system, in turn, actuates the actuator of the front derailleur so as to move the chain onto a toothed wheel of greater diameter among the toothed wheels associated with the axle of the pedal cranks.

Finally, if a cyclist wishes to perform a downward gearshifting of the front derailleur, he must lower the lever, or correspondingly press the side button, of the manual gearshift control device mounted on the left of the handlebars, thus activating the respective switch. A downward gearshifting signal of the front derailleur is thus generated, which is transmitted, through the multi-conductor cable, to the interface and from this to the power system of the electronic gearshifting control unit. The power system, in turn, actuates the actuator of the front derailleur so as to move the chain onto a toothed wheel of smaller diameter.

The Applicant has now realised that a cyclist could wish to have inverted gearshifting commands, due to personal preference, due to physical characteristics, for example left or right-handed cyclist, and/or due to particular requirements, for example associated with riding style, in particular with the aerodynamic position taken up during a time trial in the case of gearshift control devices of the bar-end type.

More specifically, a cyclist could wish to command upward gearshifting by lowering, instead of lifting, the lever, or by pressing the side button, instead of the upper button, of the manual gearshift control device and to command downward gearshifting by lifting, instead of lowering, the lever, or by pressing the upper button, instead of the side button, of the manual gearshift control device.

Furthermore, the cyclist could wish to use the manual gearshift control device, operated by a lever or buttons, mounted on the right of the handlebars to command upward gearshifting both of the front derailleur and of the rear derailleur and to use the manual gearshift control device, operated by a lever or buttons, mounted on the left of the handlebars to command downward gearshifting both of the front derailleur and of the rear derailleur, or vice-versa.

Furthermore, other configurations of inversion or variation of the controls may be desirable, for example inversions between the upward and/or downward gearshifting controls and the MODE and/or SET commands defined above.

Also in the case of a control device not of the bar-end type, the cyclist could have a reason to wish to vary the gearshifting commands imparted with each lever/button.

The technical problem forming the basis of the present invention is, therefore, to allow the cyclist to personalise the generation, by means of manual control devices, of upward and downward gearshifting controls of the rear and/or front derailleur of the bicycle based on his preferences and/or needs, thus ensuring a high versatility in use of the control devices themselves.

SUMMARY

In a first aspect thereof, the present invention relates to a command inverter according to claim 1; preferred characteristics are given in the dependent claims. The invention also relates to a kit of parts comprising at least one command inverter according to the invention and possibly at least one gearshift control device according to claim 14.

More specifically, the command inverter for at least one bicycle gearshift control device comprises:
  a first interface with an electronic gearshifting control unit, said first interface comprising a plurality of electrical terminations;
  a second interface with said at least one gearshift control device, said second interface comprising a plurality of electrical terminations matching with and corresponding to the electrical terminations of the first interface; wherein at least one electrical termination of the first interface is not electrically connected to a corresponding electrical termination of the second interface.

Preferably, at least one electrical termination of the first interface is electrically connected to a corresponding electrical termination of the second interface.

Preferably, said at least one electrical termination of the first interface that is not electrically connected to a corresponding electrical termination of the second interface comprises a subplurality of electrical terminations of the first interface that are electrically connected to a corresponding subplurality of electrical terminations of the second interface.

Preferably, said subplurality of electrical terminations of the first interface and said subplurality of electrical terminations of the second interface each comprise a pair of electrical terminations.

In an embodiment, said first interface is configured to couple with a connector of the electronic gearshifting control unit and said second interface is configured to couple with a connector of one manual gearshift control device, wherein said connector of the electronic gearshifting control unit is configured to couple with said connector of the manual control device when the command inverter is not arranged between them.

Preferably, said at least one electrical termination of the first interface that is not electrically connected to a corresponding electrical termination of the second interface comprises a third and fourth electrical terminations, said third electrical termination of the first interface being connected to a fourth electrical termination of the second interface through a third conductive means and said fourth electrical termination of the first interface being connected to a third electrical termination of the second interface through a fourth conductive means.

In an embodiment, the electrical terminations of said first interface are housed in a first main body, the electrical terminations of said second interface are housed in a second main body and in a possible third main body and the electrical terminations of the first and second interface are connected through conducting wires of a multiconductor cable, possibly branched.

In an embodiment, the electrical terminations of said first and second interface are housed at distinct faces of a container body and the electrical terminations of the first and second interface are connected through conductive rods or foils extending within the container body.

In an embodiment, said first interface is configured to couple with a first and second connector of the electronic gearshifting control unit and said second interface is configured to couple with a connector of a right manual control device and with a connector of a left manual control device, wherein said first and second connector of the electronic gearshifting control system are configured to couple with said connector of the right manual control device and with said connector of the left manual control device when the command inverter is not arranged between them.

In an embodiment, a first subplurality of electrical terminations of said first interface is configured to couple with a first connector of the electronic gearshifting control unit, a second subplurality of electrical terminations of said first interface is configured to couple with a second connector of the electronic gearshifting control unit, a first subplurality of electrical terminations of the second interface is configured to couple with a connector of a right manual control device and a second subplurality of electrical terminations of the second interface is configured to couple with a connector of a left manual control device.

Preferably, said at least one electrical termination of the first interface that is not electrically connected to a corresponding electrical termination of the second interface comprises at least one electrical termination of the first subplurality of electrical terminations of the first interface that is electrically connected to at least one electrical termination of the second subplurality of electrical terminations of the second interface and at least one electrical termination of the second subplurality of electrical terminations of the first interface that is electrically connected to at least one electrical termination of the first subplurality of electrical terminations of the second interface.

Preferably, at least one electrical termination of the first subplurality of electrical terminations of the first interface is electrically connected to at least one electrical termination of the first subplurality of electrical terminations of the second interface and at least one electrical termination of the second subplurality of electrical terminations of the first interface is electrically connected to at least one electrical termination of the second subplurality of electrical terminations of the second interface.

Preferably, said electrical terminations comprise a fourth and a seventh electrical termination, said fourth electrical termination of the first interface being connected to a seventh electrical termination of the second interface through a fourth conductive means and said seventh electrical termination of the first interface being connected to a fourth electrical termination of the second interface through a seventh conductive means.

In an embodiment, the electrical terminations of said first interface are housed in a first main body and in a second main body, the electrical terminations of said second interface are housed in a third main body and in a fourth main body and the electrical terminations of the first and second interface are connected through a printed circuit board connected to said main bodies through respective multiconductor cables.

Preferably, said electrical terminations of the first interface are male electrical terminations and said electrical terminations of the second interface are female electrical terminations.

Preferably, said plurality of electrical terminations of the first interface and said plurality of electrical terminations of the second interface are arranged in the respective interfaces so as to univocally define the correspondence among the electrical terminations of the first interface and the electrical terminations of the second interface.

Preferably, said plurality of electrical terminations of the first interface and said plurality of electrical terminations of the second interface are arranged in a respective shaped portion of at least one main body so as to univocally define the correspondence among the electrical terminations of the first interface and the electrical terminations of the second interface.

Preferably, said connectors are of the removable type, so as to allow the inverter to be interposed, or not, in a particularly easy manner.

In a second aspect thereof, the invention relates to a kit of parts comprising at least one command inverter indicated above and optionally one or two manual gearshift control devices.

Preferably, said gearshift control devices are control devices of the bar-end type.

In the rest of the present description and in the following claims, an electrical termination is defined as matching another electrical termination if the two electrical terminations have shapes such as to allow a shape coupling therebetween, for example a pair of male and female electrical terminations. Matching must not however be taken in the sense that matching electrical terminations are in use coupled together, which is actually not the case. The electrical terminations of the first interface and the electrical terminations of the second interface are matching to adapt to the electrical terminations, matching one another, of the CPU and of the control devices between which the command inverter is arranged.

In the rest of the present description and in the following claims, a termination of an interface is defined as corresponding to a termination of another interface if it occupies in the interface of which it is part and relative to the other terminations of such an interface, the same position that the termination of the other interface occupies in the other interface relative to the remaining terminations of the other interface.

In the rest of the present description we will refer to a command inverter for bicycle gearshift control devices of the bar-end type, but it should be understood that the command inverter of the invention is equally applicable to gearshift control devices mounted on a conventional handlebars.

BRIEF DESCRIPTION OF THE DRAWINGS

Further characteristics and advantages of the invention will become clearer from the following detailed description of preferred embodiments thereof, made with reference to the attached drawings. In such drawings:

FIG. 1 is a perspective and partially schematic view of a command inverter for a manual bicycle gearshift control device according to a first embodiment of the invention and of the electrical coupling connectors of the manual gearshift control device and of the electronic gearshifting control unit between which it can be arranged;

FIG. 2 is a schematic representation of the electrical connection between electrical terminations of a first interface and matching and corresponding electrical terminations of a second interface of the command inverter of FIG. 1;

FIG. 3 is a perspective view with cut out parts of an alternative embodiment of the command inverter of the invention;

FIG. 4 is a perspective view of the command inverter of FIG. 3, with cut out parts to better illustrate the electrical connection between the electrical terminations of the first and second interface;

DETAILED DESCRIPTION OF PREFERRED EMBODIMENTS

Figure 5:
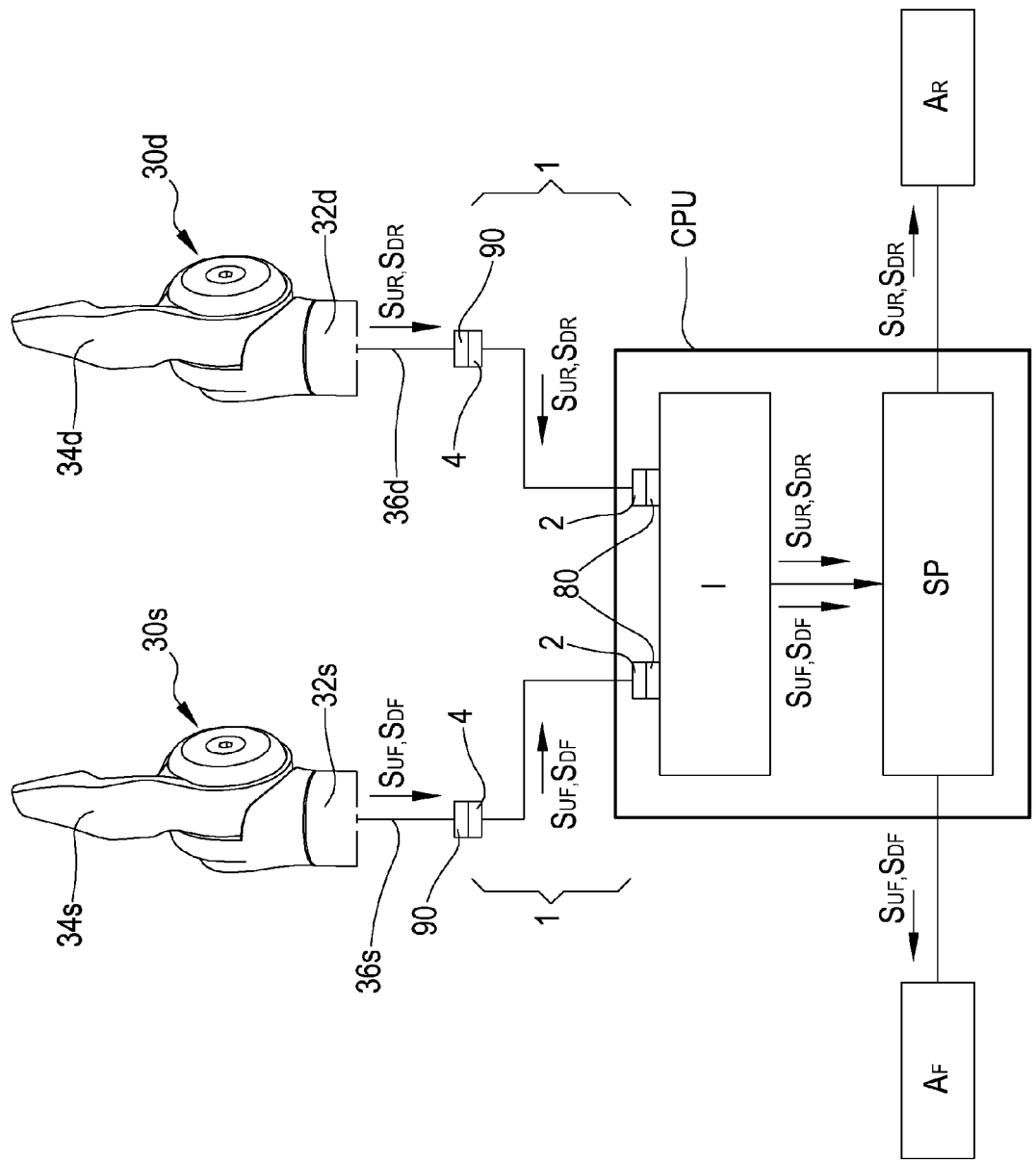
FIG. 5 is a schematic representation of the mode of electrical connection of a pair of command inverters of FIG. 1 or of FIG. 3 between a respective manual gearshift control device and the electronic gearshifting control unit of a bicycle.

FIG. 1 shows a command inverter according to a first embodiment of the invention, indicated in general with reference numeral 1.

The command inverter 1 comprises a first interface 2 for electrical connection to an electronic gearshifting control unit CPU (FIG. 5), a second interface 4 for electrical connection to a manual bicycle gearshift control device 30d, 30s (FIG. 5) mounted on the handlebars of the bicycle and a multiconductor cable 6 for electrical connection between the first interface 2 and the second interface 4.

In particular, the first interface 2 of the command inverter 1 is formed in a first main body 3, preferably substantially cylindrical, in which a plurality of electrical terminations is housed. In the illustrated embodiment there are a first, a second, a third and a fourth electrical termination $2_G$, $2_M$, $2_U$, $2_D$, suitable for electrically coupling in a removable manner with corresponding first, second, third and fourth matching electrical terminations, $80_G$, $80_M$, $80_U$, $80_D$, respectively, of a connector 80 associated with an interface I of the electronic control unit CPU (FIG. 5).

The electrical terminations $2_G$, $2_M$, $2_U$, $2_D$ are distributed in the first interface 2 of the command inverter 1 according to a univocal coupling configuration with the corresponding matching terminations $80_G$, $80_M$, $80_U$, $80_D$ of the connector 80. In other words, each electrical termination $2_G$, $2_M$, $2_U$, $2_D$ of the first interface 2 can be coupled only with the corresponding matching electrical termination $80_G$, $80_M$, $80_U$, $80_D$ of the connector 80.

In the illustrated embodiment, the electrical terminations $2_G$, $2_M$, $2_U$, $2_D$ are male electrical terminations and the matching and corresponding electrical terminations $80_G$, $80_M$, $80_U$, $80_D$ are female electrical terminations, but of course, in a totally equivalent way, it is possible to provide female electrical terminations $2_G$, $2_M$, $2_U$, $2_D$ and male electrical terminations $80_G$, $80_M$, $80_U$, $80_D$. The configuration shown may be preferable to avoid exposed male contacts on the electronic control unit CPU.

The second interface 4 of the command inverter 1 comprises a main body 7, also preferably substantially cylindrical, in which a plurality of electrical terminations is housed. In the illustrated embodiment, there are a first, a second, a third and a fourth electrical termination, $4_G$, $4_M$, $4_U$, $4_D$, respectively, suitable for electrically coupling in a removable manner with corresponding matching first, second, third and fourth electrical terminations, $90_G$, $90_M$, $90_U$, $90_D$, respectively, of a connector 90 associated with the device 30d, 30s for actuating the gearshift of a bicycle (FIG. 5).

The electrical terminations $4_G$, $4_M$, $4_U$, $4_D$ are distributed on the second interface 4 according to a univocal coupling configuration with the corresponding matching terminations $90_G$, $90_M$, $90_U$, $90_D$ of the connector 90. In other words, each electrical termination $4_G$, $4_M$, $4_U$, $4_D$ of the second interface 4 can be coupled only with the corresponding electrical termination $90_G$, $90_M$, $90_U$, $90_D$ of the connector 90.

In the illustrated embodiment the electrical terminations $4_G$, $4_M$, $4_U$, $4_D$ are female electrical terminations and the matching and corresponding electrical terminations $90_G$, $90_M$, $90_U$, $90_D$ are male electrical terminations, but of course, in a totally equivalent way, it is possible to provide male electrical terminations $4_G$, $4_M$, $4_U$, $4_D$ and female electrical terminations $90_G$, $90_M$, $90_U$, $90_D$.

The univocal coupling between terminations $2_G$, $2_M$, $2_U$, $2_D$ of the first interface and matching and corresponding terminations $80_G$, $80_M$, $80_U$, $80_D$ of the connector 80 and between terminations $4_G$, $4_M$, $4_U$, $4_D$ of the second interface and matching and corresponding terminations $90_G$, $90_M$, $90_U$, $90_D$ of the connector 90 can be obtained by means of the geometrical arrangement, for example asymmetric as shown in FIG. 1, of the electrical terminations in the interfaces 2 and 4 and in the associated connectors 80 and 90, and/or by means of the asymmetric shape of the main bodies 3 and 7 of the command inverter 1 and/or of the connectors 80 and 90, shown in FIG. 1, and/or using a different colour for the different terminations and attributing the same colour to corresponding electrical terminations and/or with other identifying marks.

It should also be noted that the connectors 80 and 90 have matching and corresponding terminations, $80_G$, $80_M$, $80_U$, $80_D$ and $90_G$, $90_M$, $90_U$, $90_D$, respectively, which are suitable for univocally coupling when the command inverter 1 is not arranged between the gearshifting control device 30d, 30s and the electronic gearshifting control unit CPU of the bicycle.

Preferably, at the first interface 2 the main body 3 has an engagement element, for example a seat 12, suitable for cooperating with a corresponding engagement element, for example a tooth 82, provided in the connector 80 of the electronic gearshifting control unit CPU, to block the first interface 2 and the connector 80 in their connected configuration and contribute to define the univocity of coupling between interface and connector.

Similarly, at the second interface 4 the main body 7 preferably has an engagement element, for example a tooth 14, suitable for cooperating with a corresponding engagement element, for example a seat 94, provided in the connector 90 to block the second interface 4 and the connector 90 in their connected configuration and contribute to define the univocity of coupling between interface and connector.

In general, although tooth and seat coupling elements have been illustrated, the present invention allows any mode of coupling that requires a minimal predetermined force to separate the command inverter 1 from the connectors 80 and 90.

The terminations $2_G$, $2_M$, $2_U$, $2_D$ of the first interface 2 and the terminations $4_G$, $4_M$, $4_U$, $4_D$ of the second interface 4 are electrically connected together by means of the electrical multiconductor cable 6, comprising, in the illustrated embodiment, a first, a second, a third and a fourth conducting wire, $6_G$, $6_M$, $6_U$, $6_D$, respectively. Each conducting wire $6_G$, $6_M$, $6_U$, $6_D$ can comprise a plurality of strands.

Preferably, each conducting wire $6_G$, $6_M$, $6_U$, $6_D$ of the multiconductor cable 6 is coated by a respective first insulating sheath (not shown) and the conducting wires $6_G$, $6_M$, $6_U$, $6_D$ thus coated are in turn wholly coated by an insulating sheath 16 to form the multiconductor cable 6.

In particular, and with reference to FIG. 2, the first conducting wire $6_G$ connects together the first electrical termination $2_G$ of the first interface 2 and the first electrical termination $4_G$ of the second interface 4; the second conducting wire $6_M$ connects together the second electrical termination $2_M$ of the first interface 2 and the second electrical termination $4_M$ of the second interface 4; the third conducting wire $6_D$ connects together the fourth electrical termination $2_D$ of the first interface 2 and the third electrical termination $4_U$ of the second interface 4; and the fourth conducting wire $6_U$ connects together the third electrical termination $2_U$ of the first interface 2 and the fourth electrical termination $4_D$ of the second interface 4.

The first conducting wire $6_G$ is the earth conducting wire; in use, an electric MODE/SET signal $s_M$ for selecting an operating mode selected from normal travel, setting of gearshift parameters (MODE) and/or for selecting a value of the selected gearshift parameters (SET) between the control device 30d, 30s and the electronic control unit CPU (FIG. 5) travels along the second conducting wire $6_M$; in use, a signal $s_{DR}$, $s_{DF}$ for controlling the downward gearshifting of the rear or front derailleur arriving from the right or left control device 30d, 30s and directed to the electronic control unit CPU (FIG. 5) travels along the third conducting wire $6_D$; and, in use, a control signal $s_{UR}$, $s_{UF}$ of the upward gearshifting of the rear or front derailleur arriving from the right or left control device 30d, 30s and directed to the electronic control unit CPU (FIG. 5) travels along the fourth conducting wire $6_U$.

It results that the first and second conducting wire $6_G$ and $6_M$ of the multiconductor cable 6 electrically connect together matching and corresponding electrical terminations $2_G$-$4_G$ and $2_M$-$4_M$ of the first and second interface 2 and 4 of the command inverter 1. Differently, the third and fourth conducting wire $6_D$ and $6_U$ of the multiconductor cable 6 electrically connect together matching and not corresponding electrical terminations $2_D$-$4_U$ and $2_U$-$4_D$ of the first and second interface 2 and 4 of the command inverter 1. Therefore, the electrical terminations $2_D$ and $2_U$ of the first interface 2 are not electrically connected to matching and corresponding electrical terminations of the second interface 4.

Thanks to such an inversion of electrical connection between pairs of electrical terminations of the two interfaces, an inversion is obtained between the upward and downward gearshifting controls of the rear or front derailleur of the bicycle, as will become clearer hereafter. In other words, when the cyclist lifts the lever, for example of the gearshift control device 30d, mounted on the right of the handlebars, he commands downward gearshifting, instead of upward gearshifting, as would usually be the case, of the rear derailleur and vice-versa, when he lowers the lever, he commands upward gearshifting, instead of downward gearshifting, as would usually be the case, of the rear derailleur. The same applies to the gearshift control device 30s mounted on the left of the handlebars, which commands gearshifting of the front derailleur. There is a similar inversion in the case of button-operated control devices.

FIGS. 3 and 4 show a command inverter according to an alternative embodiment to that of FIG. 1.

The command inverter, indicated in general with reference numeral 10, comprises a container body 70, preferably substantially cylindrical, suitable for housing electrical terminations $20_G$, $20_M$, $20_U$, $20_D$ and $40_G$, $40_M$, $40_U$, $40_D$, respectively, of a first interface 20 for electrical connection to an electronic gearshifting control unit CPU (FIG. 5) and of a second interface 40 for electrical connection to a manual control device 30d, 30s (FIG. 5) mounted on the handlebars of the bicycle. Preferably, the first and second interface 20 and 40 are formed on opposite sides with respect to the container body 70.

The first and second interface 20 and 40 are electrically connected through a plurality of conductive rods or foils, in particular a first, a second, a third and a fourth conductive rod, $60_G$, $60_M$, $60_U$, $60_D$, respectively, housed within the container body 70 and preferably co-moulded with the plastic material of the container body 70. Preferably, the electrical terminations are directly formed at the ends of the rods.

In particular, in the first interface 20 a plurality of electrical terminations $20_G$, $20_M$, $20_U$, $20_D$ are present. In the illustrated embodiment, a first, a second, a third and a fourth termination $20_G$, $20_M$, $20_U$, $20_D$ are provided, suitable for electrically coupling with corresponding matching electrical terminations $80_G$, $80_M$, $80_U$, $80_D$ of the connector 80 (FIG. 1) associated with an interface I of the electronic control unit CPU (FIG. 5).

As for the command inverter 1 of FIGS. 1 and 2, the electrical terminations $20_G$, $20_M$, $20_U$, $20_D$ are male electrical terminations distributed in the first interface 20 according to a univocal coupling configuration with corresponding female terminations $80_G$, $80_M$, $80_U$, $80_D$ of the connector 80. In other words, each male electrical termination $20_G$, $20_M$, $20_U$, $20_D$ of the first interface 20 can be coupled only with the corresponding female electrical termination $80_G$, $80_M$, $80_U$, $80_D$ of the connector 80. Of course, in a totally equivalent way, the electrical terminations $20_G$, $20_M$, $20_U$, $20_D$ of the first interface 20 can be female electrical terminations suitable for electrically coupling with corresponding male electrical terminations $80_G$, $80_M$, $80_U$, $80_D$ of the connector 80.

In the second interface 40 a plurality of electrical terminations are present. In the illustrated embodiment, a first, a second, a third and a fourth electrical termination $40_G$, $40_M$, $40_U$, $40_D$ are provided suitable for electrically coupling with corresponding matching electrical terminations $90_G$, $90_M$, $90_U$, $90_D$ of the connector 90 (FIG. 1) associated with a control device 30d, 30s (FIG. 5).

As for the command inverter 1 of FIGS. 1 and 2, the electrical terminations $40_G$, $40_M$, $40_U$, $40_D$ are female electrical terminations distributed in the second interface 40 according to a univocal coupling configuration with corresponding male terminations $90_G$, $90_M$, $90_U$, $90_D$ of the connector 90. In other words, each female electrical termination $40_G$, $40_M$, $40_U$, $40_D$ of the first interface 40 can be coupled only with the corresponding male electrical termination $90_G$, $90_M$, $90_U$, $90_D$ of the connector 90. Of course, in a totally equivalent way, the electrical terminations $40_G$, $40_M$, $40_U$, $40_D$ of the second interface 40 can be male electrical terminations suitable for electrically coupling with corresponding female electrical terminations $90_G$, $90_M$, $90_U$, $90_D$ of the connector 90.

The univocal coupling between terminations $20_G$, $20_M$, $20_U$, $20_D$ of the first interface and the matching and corresponding terminations $80_G$, $80_M$, $80_U$, $80_D$ of the connector 80 and between terminations $40_G$, $40_M$, $40_U$, $40_D$ of the second interface 40 and the matching and corresponding terminations $90_G$, $90_M$, $90_U$, $90_D$ of the connector 90 can be obtained by the geometric arrangement, for example asymmetric as shown in FIGS. 3 and 4, of the electrical terminations in the interfaces 20 and 40 and in the associated connectors 80 and 90, and/or by the asymmetric shape of the interfaces 20 and 40 of the command inverter 1 and of the connectors 80 and 90, shown in FIG. 1, and/or by using a different colour and/or mark for the different terminations and attributing the same colour and/or mark to corresponding electrical terminations.

Preferably, at the first interface 20, the container body 70 has an engagement element, for example a seat 22, suitable for cooperating with the tooth 82 (FIG. 1) of the connector 80 to block the first interface 20 and the connector 80 in their connected configuration and contribute to defining the univocity of coupling between the command inverter 10 and the connector 80.

Similarly, at the second interface 40 the container body 70 preferably has an engagement element, for example a tooth 44, suitable for cooperating with the seat 94 (FIG. 1) of the connector 90 to block the second interface 40 and the connector 90 in their connected configuration and contribute to the univocity of coupling between the command inverter 10 and the connector 90.

Similarly to what has been described for the command inverter 1 and with reference to FIG. 2, the first conductive rod $60_G$ connects together the first electrical termination $20_G$ of the first interface 20 and the first electrical termination $40_G$ of the second interface 40; the second conductive rod $60_M$ connects together the second electrical termination $20_M$ of the first interface 20 and the second electrical termination $40_M$ of the second interface 40; the third conductive rod $60_D$ connects together the fourth electrical termination $20_D$ of the first interface 20 and the third electrical termination $40_U$ of the second interface 40; and the fourth conductive rod $60_U$ connects together the third electrical termination $20_U$ of the first interface 20 and the fourth electrical termination $40_D$ of the second interface 40.

With reference back to FIG. 3, the first conductive rod $60_G$ is the earth rod; in use, an electric MODE/SET signal $s_M$ between the control device 30d, 30s and the electronic control unit CPU (FIG. 5) travels along the second conductive rod $60_M$; in use, a signal $s_{DR}$, $s_{DF}$ for controlling the downward gearshifting of the rear or front derailleur arriving from the right or left control device 30d, 30s and directed to the electronic control unit CPU (FIG. 5) travels along the third conductive rod $60_D$; and, in use, an electric signal $s_{UR}$, $s_{UF}$ for controlling the upward gearshifting of the rear or front derailleur arriving from the right or left control device 30d, 30s and directed to the electronic control unit CPU (FIG. 5) travels along the fourth conductive rod $60_U$.

Also in this embodiment, the conductive rods $60_G$ and $60_M$ electrically connect together matching and corresponding electrical terminations $20_G$-$40_G$ and $20_M$-$40_M$ of the first and second interface 20 and 40 of the command inverter 10. Differently, the conductive rods $60_D$ and $60_U$ connect together matching and not corresponding electrical terminations $20_D$-$40_U$ and $20_U$-$40_D$ of the first and second interface 20 and 40 of the command inverter 10. Therefore, the electrical terminations $20_D$ and $20_U$ of the first interface 20 are not electrically connected to matching and corresponding electrical terminations of the second interface 40.

Thanks to such an inversion of connection between pairs of electrical terminations of the two interfaces 20 and 40, an inversion is obtained between the upward and downward gearshifting controls of the rear or front derailleur of the bicycle.

With reference to FIGS. 2 and 5, the mode of connection of a pair of control inverters 1 of FIG. 1 between a lever-operated control device 30d of the bar-end type mounted on the right of the handlebars and an analogous device 30s mounted on the left of the handlebars and an electronic gearshifting control unit CPU of the bicycle are described.

Nevertheless, it should be understood that what has been described and illustrated with reference to the command inverter 1 of FIG. 1 applies in an absolutely identical manner to the command inverter 10 of FIGS. 3 and 4. Moreover, although reference is made to lever-operated control devices of the bar-end type, nothing changes if these devices are replaced by lever-operated control devices not of the bar-end type or by button-operated manual control devices of the bar-end type or not of the bar-end type or in the case of a semi-automatic gearshift. Furthermore, although in the scheme of FIG. 5 two control inverters 1 are illustrated, it is possible to provide a single command inverter 1 associated with the right control device or with the left control device, in particular intended to impart a control signal of a change of a transmission ratio, the electronic control unit taking care of transforming the command into a gearshifting command of the rear derailleur and/or of the front derailleur.

As stated before, in the standard configuration of a handlebars, the right control device 30d is suitable for controlling upward and downward gearshifting of the rear derailleur of the bicycle, whereas the left control device 30s is suitable for controlling upward and downward gearshifting of the front derailleur of the bicycle.

Each control device 30d, 30s comprises an assembly portion 32d and 32s suitable for being mounted at the end of handlebars for bar-end controls facing forwards in the travel direction of the bicycle, a control lever 34d and 34s projecting forwards from the assembly portion of the control device in the travel direction of the bicycle and electrical actuation means, typically a pair of switches (not shown) and a connector 90 for connecting to an electronic gearshifting control unit CPU, the connector being mounted at the end of a multiconductor cable 36d, 36s.

Preferably, each control device 30d, 30s can also provide a switch (not shown) for so-called MODE command, controlled by a lever or by a button (not shown), for selecting an operating mode selected from normal travel, setting of gearshift parameters etc, and/or a switch for so-called SET command for selecting a value of the selected gearshift parameters.

The electronic gearshifting control unit CPU comprises an interface I, in electrical connection with the switches of the control devices 30d, 30s mounted on the right and left of the handlebars, and a power system SP in electrical connection with the interface I. The interface I is suitable for receiving upward and downward gearshifting control signals imparted through the switches of the pair of control devices 30d, 30s and for transmitting them to the power system SP that, as a function of the gearshifting control signal received, actuates a respective actuator $A_R$ and $A_F$ of the rear and/or front derailleur so as to move the motion transmission chain on the toothed wheels associated with the axle of the pedal cranks and with the hub of the rear wheel, so as to establish the transmission ratio selected by the cyclist, thus performing a gearshifting.

Each control device 30d, 30s is connected by means of the connector 90 of the electrical multiconductor cable 36d, 36s to a respective command inverter 1 by coupling the connector 90 with the respective second interface 4 of the command inverter 1. The first interface 2 of each command inverter 1 is, on the other hand, connected to a respective connector 80 of the interface I of the electronic gearshifting control unit CPU.

It is now assumed that the cyclist wishes to carry out an upward gearshifting of the rear derailleur. He lowers the lever 32d of the right control device 30d thus activating the corresponding switch. A signal $s_{UR}$ is generated that, through the multiconductor cable 36d, reaches the electrical termination $90_D$ of the connector 90 and from this the electrical termination $4_D$ of the second interface 4 of the command inverter 1.

Thanks to the presence of the command inverter 1, the signal $s_{UR}$ is an upward gearshifting signal of the rear derailleur. Indeed, following the scheme of electrical connection between the first and the second interface 2 and 4 illustrated in FIG. 2, the signal $s_{UR}$ transits from the electrical termination $4_D$ of the second interface 4 to the electrical termination $2_U$ of the first interface 2 of the command inverter 1, travelling along the electric wire $6_U$ of the multiconductor cable 6 of the command inverter 1, and from this to the electrical termination $80_U$ of the connector 80 of the interface I.

It results that, although the cyclist has lowered the lever, thus transmitting a signal that, in the absence of the command inverter 1, would command a downward gearshifting of the rear derailleur, since the electrical termination $90_D$ matches with and corresponds to the electrical termination $80_D$ of the electronic control unit CPU, such a signal reaches the interface I of the electronic control unit CPU on an inverted terminal, i.e. on the electrical termination $80_U$ of the connector 80 associated with the input of an upward gearshifting control signal. The interface I thus transmits an upward gearshifting signal $s_{UR}$ to the power system SP and the power system SP thus makes the actuator $A_R$ of the rear derailleur move so that it moves the chain onto a toothed wheel of greater diameter, thus performing an upward gearshifting of the rear derailleur.

It is now assumed that the cyclist wishes to carry out a downward gearshifting of the rear derailleur. He lifts the lever 32d of the right control device 30d thus activating the corresponding switch. A signal $s_{DR}$ is generated that, through the multiconductor cable 36d reaches the electrical termination $90_U$ of the connector 90 and from this the electrical termination $4_U$ of the second interface 4 of the command inverter 1.

Thanks to the presence of the command inverter 1, the signal $s_{DR}$ is a downward gearshifting signal of the rear derailleur. Indeed, following the scheme of electrical connection between the first and the second interface 2 and 4 illustrated in FIG. 2, the signal $s_{DR}$ transits from the electrical termination $4_U$ of the second interface 4 to the electrical termination $2_D$ of the first interface 2 of the command inverter 1, travelling along the electric wire $6_D$ of the multiconductor cable 6 of the command inverter 1, and from this to the electrical termination $80_D$ of the connector 80 of the interface I, associated indeed with the entry of a downward gearshifting signal.

It results that, although the cyclist has lifted the lever, thus transmitting a signal that, in the absence of the command inverter 1, would be an upward gearshifting signal of the rear derailleur, since the electrical termination $90_U$ matches with and corresponds to the electrical termination $80_U$ of the electronic control unit CPU, such a signal reaches the interface I of the electronic gearshifting control unit CPU on an inverted electrical termination, i.e. on the electrical termination $80_U$ of the connector 80. The interface I thus transmits a downward gearshifting signal $s_{DR}$ to the power system SP and the power system SP thus makes the actuator $A_R$ of the rear derailleur move so that it moves the chain onto a toothed wheel of smaller diameter, thus performing a downward gearshifting of the rear derailleur.

The same applies to the left control device 30s. In this case, when the cyclist lowers the lever 34s, a signal $s_{UF}$ is transmitted to the command inverter 1. Such a signal $s_{UF}$ enters the command inverter 1 at the electrical termination $4_D$ of the second interface 4, passes through the conducting wire $6_U$ and comes out from the command inverter 1 at the electrical termination $2_U$ of the first interface 2. The interface I of the electronic control unit CPU receives the signal $s_{UF}$ at the correct electrical termination $80_U$ so that it transmits an upward gearshifting signal to the power system SP, as desired. The power system SP thus makes the actuator $A_F$ of the front derailleur move so that it moves the chain onto a toothed wheel of greater diameter, thus performing an upward gearshifting of the front derailleur.

When, on the other hand, the cyclist lifts the lever 34s a signal $s_{DF}$ is transmitted to the command inverter 1. Such a signal $s_{DF}$ enters the command inverter 1 at the electrical termination $4_U$ of the second interface 4, passes through the conducting wire $6_D$ and comes out from the command inverter 1 at the electrical termination $2_D$ of the first interface 2. The interface I of the electronic control unit CPU receives the signal $s_{DF}$ at its electrical termination $80_D$ so that it transmits a downward gearshifting signal to the power system SP. The power system SP actuates the actuator $A_F$ of the front derailleur so that it moves the chain onto a toothed wheel of smaller diameter, thus performing a downward gearshifting of the front derailleur.

Figure 6:
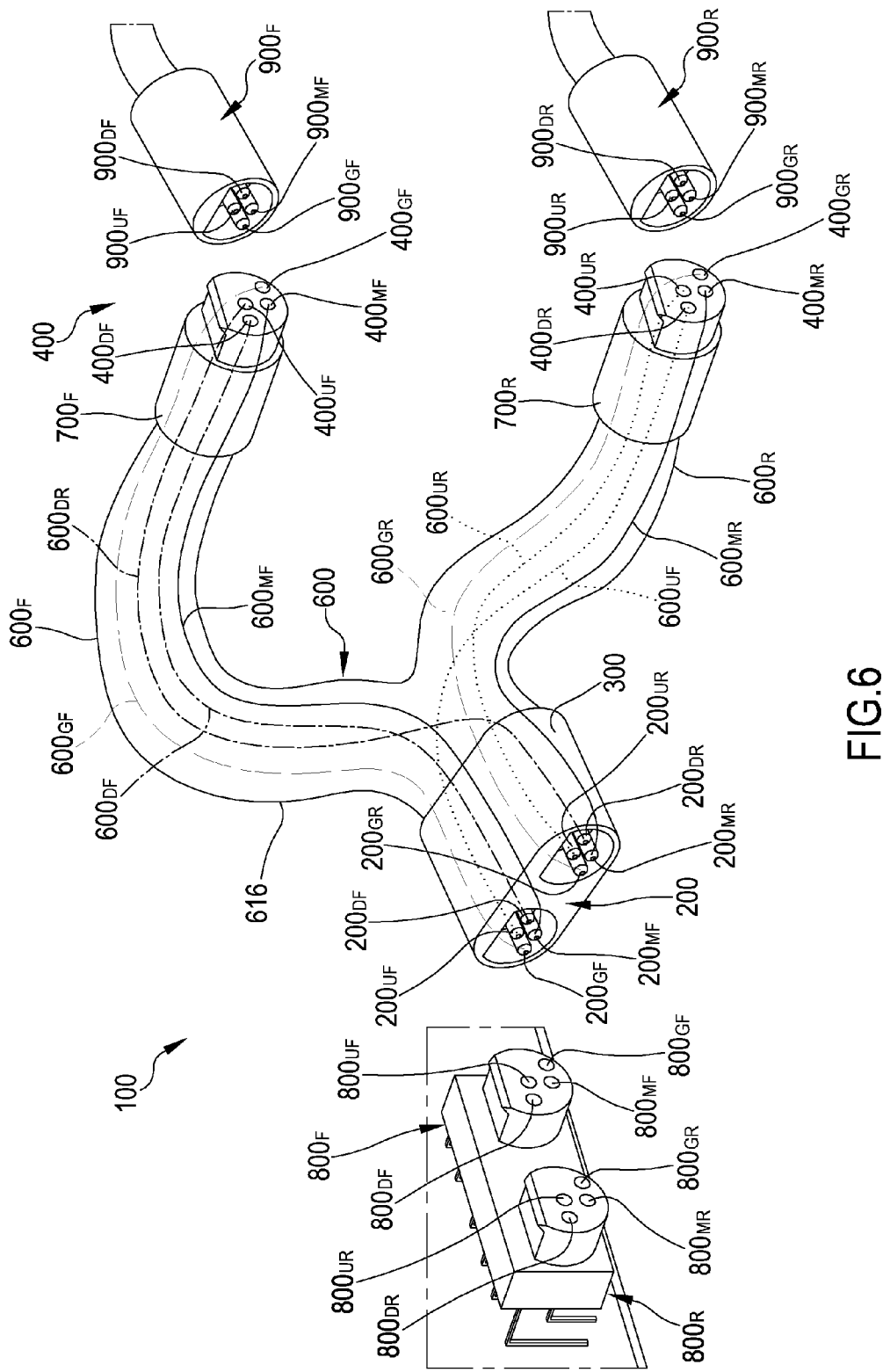
FIG. 6 is a perspective and partially schematised view of a command inverter for a pair of gearshift control devices of a bicycle according to another embodiment of the invention and of the electrical coupling connectors of the pair of gearshift control devices and of the electronic gearshifting control unit between which the command inverter can be arranged.

FIG. 6 shows a command inverter according to a third embodiment of the invention, indicated in general with reference numeral 100.

The command inverter 100 comprises a first interface 200 for electrical connection to an electronic gearshifting control unit CPU (FIG. 10), a second interface 400 for electrical connection to a pair of gearshift control devices 30d, 30s (FIG. 10) of a bicycle mounted on the handlebars of the bicycle and a branched multiconductor cable $600_R$, $600_U$ for electrical connection between the first interface 200 and the second interface 400.

Figure 10:
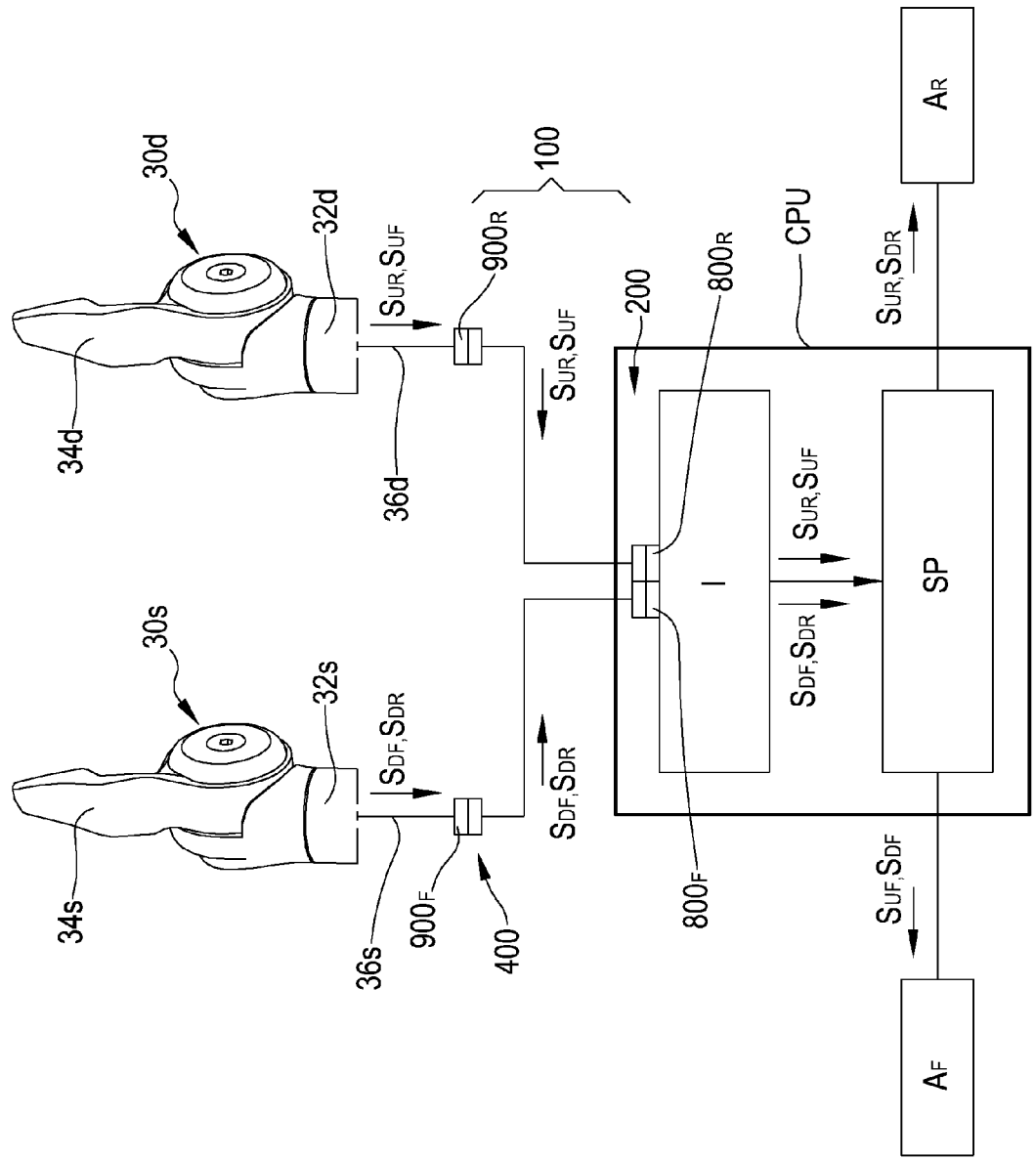
FIG. 10 is a schematic representation of the mode of electrical connection of the command inverter of FIG. 6 between a pair of gearshift control devices and the electronic gearshifting control unit of a bicycle.

In particular, the command inverter 100 comprises a first main body 300 in which the plurality of electrical terminations of the first interface 200 is housed. In the illustrated embodiment, a first, a second, a third, a fourth, a fifth, a sixth, a seventh and an eighth electrical termination $200_{GR}$, $200_{MR}$, $200_{UR}$, $200_{DR}$, $200_{GF}$, $200_{MF}$, $200_{UF}$, $200_{DF}$ are provided, which are suitable for electrically coupling with corresponding first, second, third, fourth, fifth, sixth, seventh and eighth matching electrical terminations $800_{GR}$, $800_{MR}$, $800_{UR}$, $800_{DR}$, $800_{GF}$, $800_{MF}$, $800_{UF}$, $800_{DF}$ of connectors $800_R$, $800_F$ associated with an interface I of the electronic control unit CPU (FIG. 10).

The male electrical terminations $200_{GR}$, $200_{MR}$, $200_{UR}$, $200_{DR}$, $200_{GF}$, $200_{MF}$, $200_{UF}$, $200_{DF}$ are distributed in the first interface 200 of the command inverter 100 according to a univocal coupling configuration with the corresponding female terminations $800_{GR}$, $800_{MR}$, $800_{UR}$, $800_{DR}$, $800_{GF}$, $800_{MF}$, $800_{UF}$, $800_{DF}$ of connectors $800_R$, $800_F$. In other words, each male electrical termination $200_{GR}$, $200_{MR}$, $200_{UR}$, $200_{DR}$, $200_{GF}$, $200_{MF}$, $200_{UF}$, $200_{DF}$ of the first interface 200 can be coupled only with the corresponding female electrical termination $800_{GR}$, $800_{MR}$, $800_{UR}$, $800_{DR}$, $800_{GF}$, $800_{MF}$, $800_{UF}$, $800_{DF}$ of connectors $800_R$, $800_F$.

In the illustrated embodiment, the electrical terminations $200_{GR}$, $200_{MR}$, $200_{UR}$, $200_{DR}$, $200_{GF}$, $200_{MF}$, $200_{UF}$, $200_{DF}$ of the first interface 200 are male electrical terminations and the matching and corresponding electrical terminations $800_{GR}$, $800_{MR}$, $800_{UR}$, $800_{DR}$, $800_{GF}$, $800_{MF}$, $800_{UF}$, $800_{DF}$ of connectors $800_R$, $800_F$ are female electrical terminations. Of course, in a totally equivalent way, female electrical terminations $200_{GR}$, $200_{MR}$, $200_{UR}$, $200_{DR}$, $200_{GF}$, $200_{MF}$, $200_{UF}$, $200_{DF}$ and male electrical terminations $800_{GR}$, $800_{MR}$, $800_{UR}$, $800_{DR}$, $800_{GF}$, $800_{MF}$, $800_{UF}$, $800_{DF}$ can be provided.

The command inverter 100 comprises a second and a third main body $700_R$, $700_F$, preferably substantially cylindrical. In the second main body $700_R$ a first, a second, a third and a fourth electrical termination $400_{GR}$, $400_{MR}$, $400_{UR}$, $400_{DR}$ are housed, suitable for electrically coupling with corresponding first, second, third and fourth matching electrical terminations $900_{GR}$, $900_{MR}$, $900_{UR}$, $900_{DR}$, of a connector $900_R$ associated with the manual gearshift control device 30d of a bicycle mounted on the right of the handlebars (FIG. 10). In the third main body $700_F$ a fifth, a sixth, a seventh and an eighth electrical termination $400_{GF}$, $400_{MF}$, $400_{UF}$, $400_{DF}$ are housed, which are suitable for electrically coupling with corresponding matching electrical terminations $900_{GF}$, $900_{MF}$, $900_{UF}$, $900_{DF}$ of a connector $900_F$ associated with the gearshift control device 30s of a bicycle mounted on the right of the handlebars (FIG. 10).

The electrical terminations $400_{GR}$, $400_{MR}$, $400_{UR}$, $400_{DR}$, $400_{GF}$, $400_{MF}$, $400_{UF}$, $400_{DF}$ of the second interface 400 are distributed in the second and third body $700_R$, $700_F$ of the command inverter 100 according to a univocal coupling configuration with the corresponding terminations $900_{GR}$, $900_{MR}$, $900_{UR}$, $900_{DR}$, $900_{GF}$, $900_{MF}$, $900_{UF}$, $900_{DF}$ of connectors $900_R$, $900_F$. In other words, each electrical termination $400_{GR}$, $400_{MR}$, $400_{UR}$, $400_{DR}$, $400_{GF}$, $400_{MF}$, $400_{UF}$, $400_{DF}$ of the second interface 400 can be coupled only with the corresponding electrical termination $900_{GR}$, $900_{MR}$, $900_{UR}$, $900_{DR}$, $900_{GF}$, $900_{MF}$, $900_{UF}$, $900_{DF}$ of connectors $900_R$, $900_F$. In the illustrated embodiment, the electrical terminations $400_{GR}$, $400_{MR}$, $400_{UR}$, $400_{DR}$, $400_{GF}$, $400_{MF}$, $400_{UF}$, $400_{DF}$ of the second interface 400 are female electrical terminations and the matching and corresponding electrical terminations $900_{GR}$, $900_{MR}$, $900_{UR}$, $900_{DR}$, $900_{GF}$, $900_{MF}$, $900_{UF}$, $900_{DF}$ of connectors $900_R$, $900_F$ are male electrical terminations. Of course, in a totally equivalent way, it is possible to provide female electrical terminations $400_{GR}$, $400_{MR}$, $400_{UR}$, $400_{DR}$, $400_{GF}$, $400_{MF}$, $400_{UF}$, $400_{DF}$ and male electrical terminations $900_{GR}$, $900_{MR}$, $900_{UR}$, $900_{DR}$, $900_{GF}$, $900_{MF}$, $900_{UF}$, $900_{DF}$.

The univocal coupling between the electrical terminations $200_{GR}$, $200_{MR}$, $200_{UR}$, $200_{DR}$, $200_{GF}$, $200_{MF}$, $200_{UF}$, $200_{DF}$ of the first interface 200 and the matching and corresponding electrical terminations $800_{GR}$, $800_{MR}$, $800_{UR}$, $800_{DR}$, $800_{GF}$, $800_{MF}$, $800_{UF}$, $800_{DF}$ of connectors $800_R$, $800_F$ and between the electrical terminations $400_{GR}$, $400_{MR}$, $400_{UR}$, $400_{DR}$, $400_{GF}$, $400_{MF}$, $400_{UF}$, $400_{DF}$ of the second interface 400 and the matching and corresponding electrical terminations $900_{GR}$, $900_{MR}$, $900_{UR}$, $900_{DR}$, $900_{GF}$, $900_{MF}$, $900_{UF}$, $900_{DF}$ of connectors $900_R$, $900_F$ can be obtained by the geometric arrangement, for example asymmetrical as shown in FIG. 6, of the electrical terminations in the interfaces 200 and 400 and in the associated connectors $800_R$, $800_F$ and $900_R$, $900_F$, and/or by the asymmetric shape of the main bodies 300 and $700_R$, $700_F$ of the command inverter 100 and of the connectors $800_R$, $800_F$ and $900_R$, $900_F$, again shown in FIG. 6, and/or by using a different colour and/or mark for the different terminations and attributing the same colour and/or mark to corresponding electrical terminations.

It should again be noted that the connectors $800_R$, $800_F$ and $900_R$, $900_F$ have matching and corresponding terminations, $800_{GR}$, $800_{MR}$, $800_{UR}$, $800_{DR}$, $800_{GF}$, $800_{MF}$, $800_{UF}$, $800_{DF}$ and $900_{GR}$, $900_{MR}$, $900_{UR}$, $900_{DR}$, $900_{GF}$, $900_{MF}$, $900_{UF}$, $900_{DF}$, respectively, which are suitable for coupling univocally when the command inverter 100 is not arranged between the gearshifting control device 30d, 30s and the electronic gearshifting control unit CPU of the bicycle.

The electrical terminations $200_{GR}$, $200_{MR}$, $200_{UR}$, $200_{DR}$, $200_{GF}$, $200_{MF}$, $200_{UF}$, $200_{DF}$ of the first interface 200 and the terminations $400_{GR}$, $400_{MR}$, $400_{UR}$, $400_{DR}$, $400_{GF}$, $400_{MF}$, $400_{UF}$, $400_{DF}$ of the second interface 400 are electrically connected together by means of the multiconductor cable 600 having two branches $600_R$, $600_F$, each comprising, for example, four conducting wires, $600_{GR}$, $600_{MR}$, $600_{UR}$, $600_{UF}$ and $600_{GF}$, $600_{MF}$, $600_{DF}$, $600_{DR}$, respectively. Each conducting wire $600_{GR}$, $600_{MR}$, $600_{UR}$, $600_{DR}$, $600_{GF}$, $600_{MF}$, $600_{UF}$, $600_{DF}$ can comprise a plurality of strands.

Preferably, each conducting wire $600_{GR}$, $600_{MR}$, $600_{UR}$, $600_{DR}$, $600_{GF}$, $600_{MF}$, $600_{UF}$, $600_{DF}$ of the multiconductor cable having two branches 600 is coated by a respective first insulating sheath (not shown) and the conducting wires thus coated are in turn wholly coated by a common insulating sheath 616, which follows the branching of the conductive cable 600.

Figure 7:
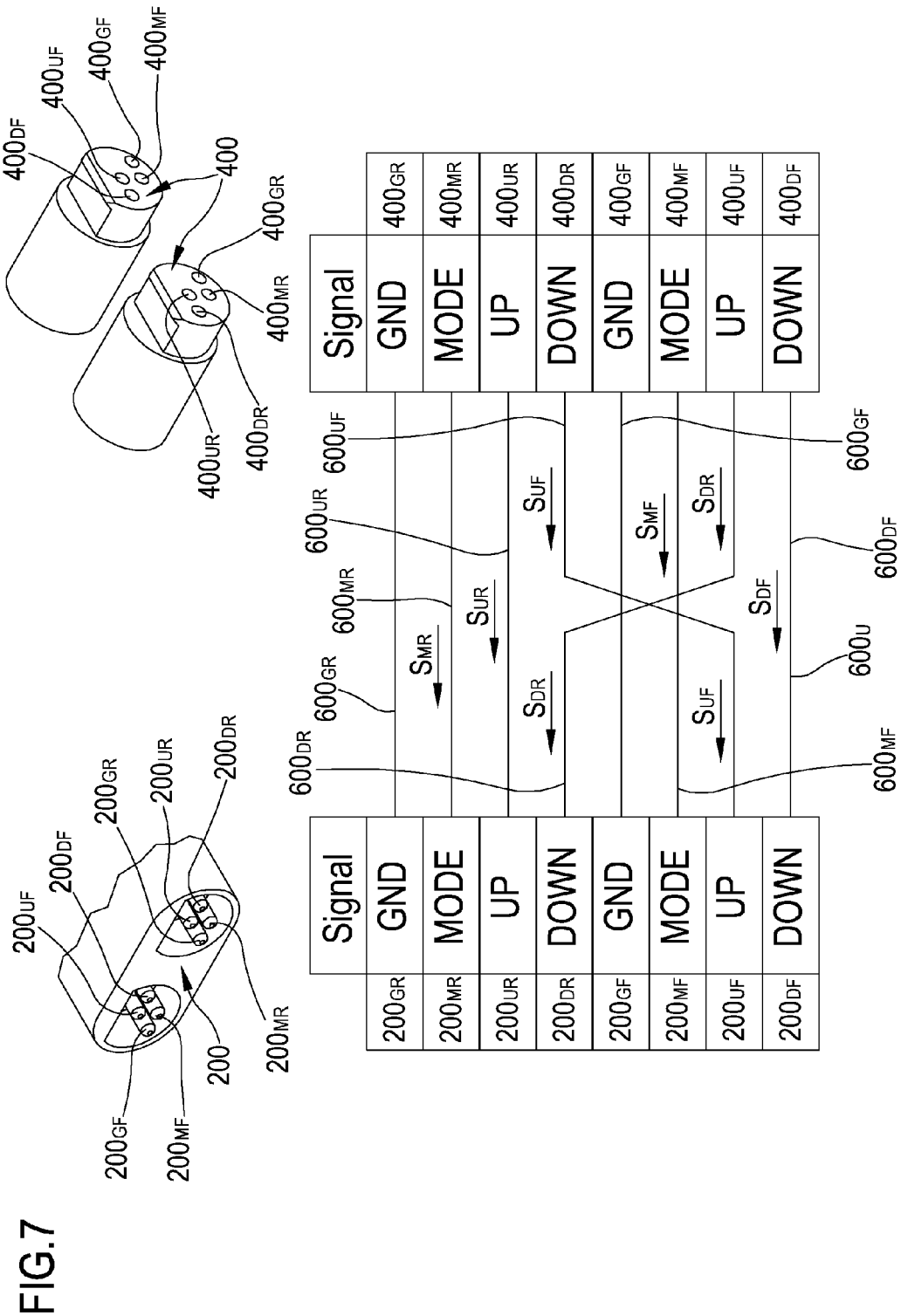
FIG. 7 is a schematic representation of the electrical connection between electrical terminations of a first interface and matching and corresponding electrical terminations of a second interface of the command inverter of FIG. 6.

In particular, and with reference to FIG. 7, the first conducting wire $600_{GR}$ connects together the first electrical termination $200_{GR}$ of the first interface 200 and the first electrical termination $400_{GR}$ of the second interface 400; the second conducting wire $600_{MR}$ connects together the second electrical termination $200_{MR}$ of the first interface 200 and the second electrical termination $400_{MR}$ of the second interface 400; the third conducting wire $600_{UR}$ connects together the third electrical termination $200_{UR}$ of the first interface 200 and the third electrical termination $400_{UR}$ of the second interface 400; the fourth conducting wire $600_{DR}$ connects together the fourth electrical termination $200_{DR}$ of the first interface 200 and the seventh electrical termination $400_{UF}$ of the second interface 400; the fifth conducting wire $600_{GF}$ connects together the fifth electrical termination $200_{GF}$ of the first interface 200 and the fifth electrical termination $400_{GF}$ of the second interface 400; the sixth conducting wire $600_{MF}$ connects together the sixth electrical termination $200_{MF}$ of the first interface 200 and the sixth electrical termination $400_{MR}$ of the second interface 400; the seventh conducting wire $600_{UF}$ connects together the seventh electrical termination $200_{UF}$ of the first interface 200 and the fourth electrical termination $400_{DR}$ of the second interface 400; and the eighth conducting wire $600_{DF}$ connects together the eighth electrical termination $200_{DF}$ of the first interface 200 and the eighth electrical termination $400_{DF}$ of the second interface 400.

The first conducting wire $600_{GR}$ is the earth conducting wire associated with the right control device $30d$; in use, an electric MODE/SET signal $s_{MR}$ between the right control device $30d$ and the electronic control unit CPU (FIG. 10) travels along the second conducting wire $600_{MR}$; in use, an electric signal $s_{UR}$ for commanding upward gearshifting of the rear derailleur arriving from the right control device $30d$ and directed to the electronic control unit CPU (FIG. 10) travels along the third conducting wire $600_{UR}$; in use, an electric signal $s_{DR}$ for commanding downward gearshifting of the rear derailleur arriving from the left control device $30s$ and directed to the electronic control unit CPU (FIG. 10) travels along the fourth conducting wire $600_{DR}$; the fifth conducting wire $600_{GF}$ is the earth conducting wire associated with the left control device $30s$; in use, an electric MODE/SET signal $s_{MF}$ between the left control device $30s$ and the electronic control unit CPU (FIG. 10) travels along the sixth conducting wire $600_{MF}$; in use, an electric signal $s_{UF}$ for commanding upward gearshifting of the front derailleur arriving from the right control device $30d$ and directed to the electronic control unit CPU (FIG. 10) travels along the seventh conducting wire $600_{UF}$; and in use, an electric signal $s_{DF}$ for commanding downward gearshifting of the front derailleur arriving from the left control device $30s$ and directed to the electronic control unit CPU (FIG. 10) travels along the eighth conducting wire $600_{DF}$.

It results that the conducting wires $600_{GR}$, $600_{MR}$, $600_{UR}$ and $600_{GF}$, $600_{MF}$, $600_{DF}$ electrically connect together matching and corresponding electrical terminations $200_{GR}$-$400_{GR}$, $200_{MR}$-$400_{MR}$, $200_{UR}$-$400_{UR}$, $200_{GF}$-$400_{GF}$, $200_{MF}$-$400_{MF}$, $200_{DF}$-$400_{DF}$ of the first and second interface 200 and 400 of the command inverter 100. Differently, the conducting wires $600_{UF}$ and $600_{DR}$ connect together not corresponding electrical terminations $200_{UF}$-$400_{DR}$ and $200_{DR}$-$400_{UF}$ of the first and second interface 200 and 400 of the command inverter 100. Therefore, the electrical terminations $200_{UF}$ and $200_{DR}$ of the first interface 200 are not electrically connected to matching and corresponding electrical terminations of the second interface 400.

Thanks to such an inversion of connection between electrical terminations of the two interfaces, an inversion is obtained for example between the downward gearshifting command of the rear derailleur and the upward gearshifting command of the front derailleur of the bicycle, as will become clearer hereafter.

In other words, a cyclist by lifting the lever of the right gearshift control device 30d commands the upward gearshifting of the rear derailleur and by lowering the lever of the same right control device 30d commands the upward gearshifting of the front derailleur. Similarly, a cyclist by lifting the lever of the left gearshift control device 30s commands the downward gearshifting of the rear derailleur and by lowering the lever of the same left control device 30s, commands the downward gearshifting of the front derailleur. In other words, with the same control device, the cyclist commands upward and downward gearshifting, respectively, of both of the derailleurs, front and rear.

Figure 8:
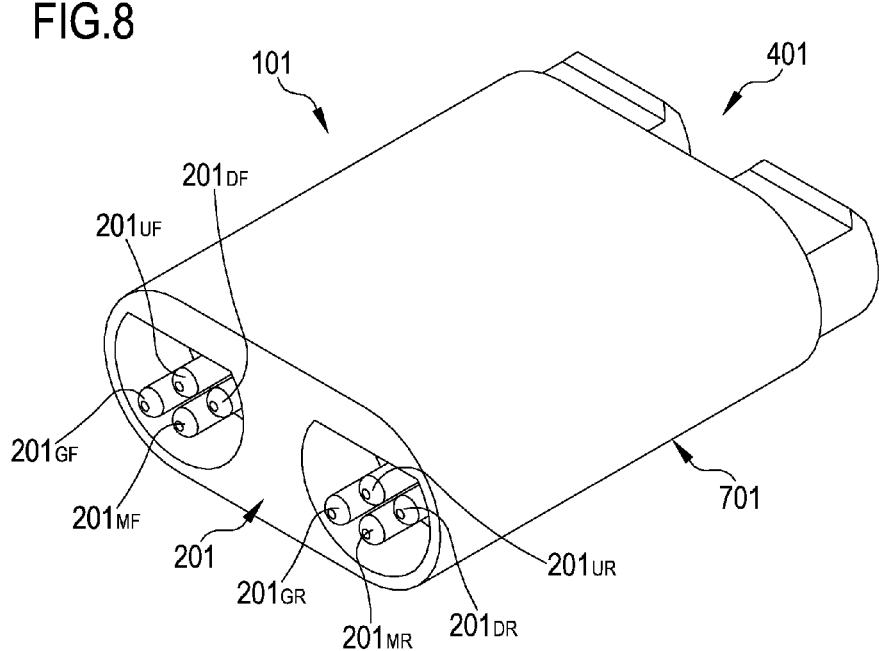
FIG. 8 is a perspective view of an alternative embodiment of the command inverter of FIGS. 6 and 7.
Figure 9:
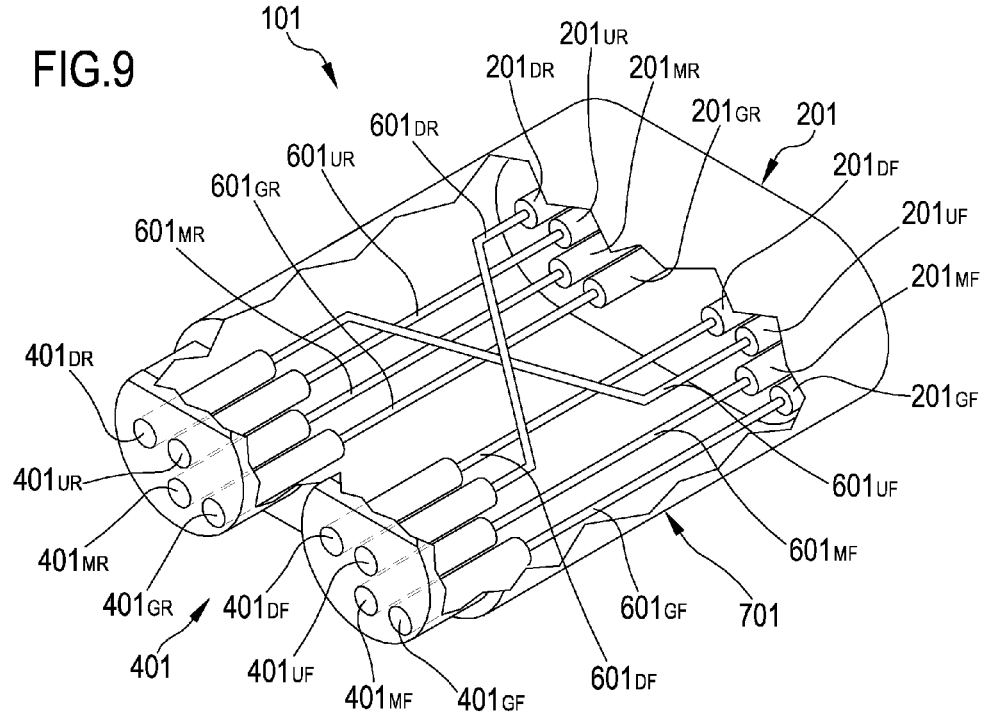
FIG. 9 is a perspective view of the command inverter of FIG. 8, with cut out parts to better illustrate the electrical connection between the electrical terminations of the first and second interface.

FIGS. 8 and 9 illustrate a command inverter according to a fourth embodiment of the invention of FIGS. 6 and 7. The command inverter 101 differs from the command inverter 100 in that it has a container body 701 in which the electrical terminations of a first interface 201 for electrical connection with the electronic gearshifting control unit CPU and of a second interface 401 for electrical connection with a pair of gearshift control devices 30d, 30s mounted on the right and left of the handlebars of the bicycle are housed and in that the multiconductor cable 600 having two branches $600_D$, $600_R$ is replaced by a plurality of conductive rods or foils $601_{GR}$, $601_{MR}$, $601_{UR}$, $601_{DR}$, $601_{GF}$, $601_{MF}$, $601_{UF}$, $601_{DF}$, similarly to the embodiment of FIGS. 3 and 4 to which we refer.

The first interface 201 comprises a first, a second, a third, a fourth, a fifth, a sixth, a seventh and an eighth male electrical termination, $201_{GR}$, $201_{MR}$, $201_{UR}$, $201_{DR}$, $201_{GF}$, $201_{MF}$, $201_{UF}$, $201_{DF}$, respectively, suitable for electrically coupling with respective female electrical terminations of connectors $800_R$, $800_F$ associated with the interface I of the electronic control unit CPU (FIG. 10).

The second interface 401 comprises a first, a second, a third and a fourth female electrical termination $401_{GR}$, $401_{MR}$, $401_{UR}$, $401_{DR}$ suitable for electrically coupling with respective male electrical terminations $900_{GR}$, $900_{MR}$, $900_{UR}$, $900_{DR}$ of the connector $900_R$ associated with the right control device 30d (FIG. 10) and a fifth, a sixth, a seventh and an eighth female electrical termination $401_{GF}$, $401_{MF}$, $401_{UF}$, $401_{DF}$ suitable for electrically coupling with respective male electrical terminations $900_{GF}$, $900_{MF}$, $900_{UF}$, $900_{DF}$ of the connector $900_D$ associated with the left control device 30s (FIG. 10). Of course, also for this alternative embodiment of the command inverter all of the possible variants outlined earlier with reference to the command inverter 100 of FIG. 6 are valid.

The connections between the electrical terminations of the first interface 201 and the electrical terminations of the second interface 401, as well as the mode of connection between the electrical terminations of the first interface 201 and the electrical terminations of connectors $800_R$, $800_F$ and the mode of connection between the electrical terminations of the second interface 401 and the electrical terminations of connectors $900_R$, $900_F$ are totally similar to those described for the command inverter 100 with reference to FIG. 7, but they are made through the rods $601_{GR}$, $601_{MR}$, $601_{UR}$, $601_{DR}$, $601_{GF}$, $601_{MF}$, $601_{UF}$, $601_{DF}$ instead of wires of a multiconductor cable.

With reference to FIGS. 7 and 10 the mode of connection of a command inverter 100 of FIG. 6 between a lever-operated manual control device 30d of the bar-end type mounted on the right of the handlebars and a lever-operated manual control device 30s of the bar-end type mounted on the left of the handlebars and an electronic gearshifting control unit CPU is shown. Nevertheless, it should be understood that what has been described and illustrated with reference to the command inverter 100 of FIG. 6 applies in an absolutely identical way to the command inverter 101 of FIGS. 8 and 9 and that the manual control devices 30d, 30s may not be of the bar-end type.

As stated earlier, in the standard configuration of a handlebars, the right control device 30d is suitable for commanding upward and downward gearshifting of the rear derailleur, whereas the left control device 30s is suitable for commanding upward and downward gearshifting of the front derailleur.

Each control device 30d and 30s is connected through an electrical multiconductor cable 36d and 36s equipped with the connector $900_R$, $900_F$ to the command inverter 100 by coupling the connector $900_R$, $900_F$ to the second interface 400 of the inverter 100. More specifically, the connector $900_R$ is coupled with the main body $700_R$ and the connector $900_F$ is coupled with the main body $700_F$. The first interface 200 of the command inverter 100, on the other hand, is connected to the connectors $800_R$, $800_F$ of the interface I of the electronic control unit CPU.

When a cyclist wishes to use the right control device 30d to perform an upward gearshifting of the rear derailleur, he lifts the lever 34d of the control device 30d thus activating the corresponding switch. An upward gearshifting signal $s_{UR}$ of the rear derailleur is generated, which through the multiconductor cable 36d reaches the electrical termination $900_{UR}$ of the connector $900_R$ and from this the termination $400_{UR}$ of the second interface 400 of the command inverter 100.

Following the scheme of electrical connection between the first and the second interface 200 and 400 illustrated in FIG. 7, the signal $s_{UR}$ transits from the electric terminal $400_{UR}$ of the second interface 400 to the electric terminal $200_{UR}$ of the first interface 200 of the command inverter 100 travelling along the electric wire $600_{UR}$ of the command inverter 100 and from this to the electric terminal $800_{UR}$ of the connector $800_R$ of the interface I. The interface I transmits the signal $s_{UR}$ to the power system SP and the power system SP thus makes the actuator $A_R$ of the rear derailleur move so that it moves the chain onto a toothed wheel of greater diameter, thus performing an upward gearshifting of the rear derailleur.

It is now assumed that a cyclist wishes to use again the right control device 30d to perform an upward gearshifting of the front derailleur. He lowers the lever 34d thus activating the corresponding switch. An upward gearshifting signal $s_{UF}$ of the front derailleur is generated, which through the multiconductor cable 36d reaches the electrical termination $900_{DR}$ of the connector $900_R$ and from this electrical termination reaches the electrical termination $400_{DR}$ of the second interface 400 of the command inverter 100.

Thanks to the presence of the command inverter 100, the signal $s_{UF}$ is an upward gearshifting signal of the front derailleur. Indeed, again following the scheme of electrical connection between the first and the second interface 200 and 400 illustrated in FIG. 7, the signal $s_{UF}$ transits from the electric terminal $400_{DR}$ of the second interface 400 to the electric terminal $200_{UF}$ of the first interface 200 of the command inverter 100 travelling along the electric wire $600_{UF}$ of the command inverter 100 and from this to the electric terminal $800_{UF}$ of the connector $800_F$ connected to the interface I.

It results that, although the cyclist has lowered the lever 34d, thus transmitting a signal that, in the absence of the command inverter 100, would be a downward gearshifting signal of the rear derailleur, such a signal reaches the interface I of the electronic control unit CPU on an inverted terminal, i.e. on the electric terminal $800_{UF}$ of the connector $800_F$ of the interface I. The interface I thus transmits an upward gearshifting signal $s_{UF}$ of the front derailleur to the power system SP and the power system SP makes the actuator $A_F$ of the front derailleur move so that it moves the chain onto a toothed wheel of greater diameter, thus performing upward gearshifting of the front derailleur.

When a cyclist wishes to use the left control device 30s to perform downward gearshifting of the front derailleur, he lowers the lever 34s of the left control device 30s thus activating the corresponding switch. A downward gearshifting signal $s_{DF}$ of the front derailleur is generated that, through the multiconductor cable 36s reaches the electrical termination $900_{DF}$ of the connector $900_F$ and from this the electrical termination $400_{DF}$ of the second interface 400 of the command inverter 100.

Following the scheme of electrical connection between the first and the second interface 200 and 400 illustrated in FIG. 7, the signal $s_{DF}$ transits from the electric terminal $400_{DF}$ of the second interface 400 to the electric terminal $200_{DF}$ of the first interface 200 of the command inverter 100 travelling along the electric wire $600_{DF}$ of the command inverter 100 and from this to the electric terminal $800_{DF}$ of the connector $800_F$ of the interface I. The interface I transmits the signal $s_{DF}$ to the power system SP, which makes the actuator $A_F$ of the front derailleur move so that it moves the chain onto a toothed wheel of smaller diameter, thus performing downward gearshifting of the front derailleur. It is now assumed that a cyclist wishes to use the same left control device 30s to perform a downward gearshifting of the rear derailleur. He lifts the lever 34s thus activating the corresponding switch. A downward gearshifting signal $s_{DR}$ of the rear derailleur is generated, which, through the multiconductor cable 36s reaches the electrical termination $900_{UF}$ of the connector $900_F$ and from this the electrical termination $400_{UF}$ of the second interface 400 of the command inverter 100.

Thanks to the presence of the command inverter 100, the signal $s_{DR}$ is a downward gearshifting signal of the rear derailleur. Indeed, again following the scheme of electrical connection between the first and the second interface 200 and 400 illustrated in FIG. 7, the electric downward gearshifting signal $s_{DR}$ transits from the electric terminal $400_{UF}$ of the second interface 400 to the electric terminal $200_{DR}$ of the first interface 200 of the command inverter 100 travelling along the electric wire $600_{DR}$ of the command inverter 100 and from this to the electric terminal $800_{DR}$ of the connector $800_R$ connected to the interface I.

It results that, although the cyclist has lifted the lever 34s, thus transmitting a signal that, in the absence of the command inverter 100, would be an upward gearshifting signal of the front derailleur, such a signal reaches the interface I of the electronic control unit CPU on an inverted electrical termination, i.e. on the electrical termination $800_{DR}$ of the connector $800_R$. The interface I thus transmits a downward gearshifting signal $s_{DR}$ of the rear derailleur to the power system SP and the power system SP makes the actuator $A_R$ of the rear derailleur move so that it moves the chain onto a toothed wheel of smaller diameter, thus performing downward gearshifting of the rear derailleur.

Figure 11:
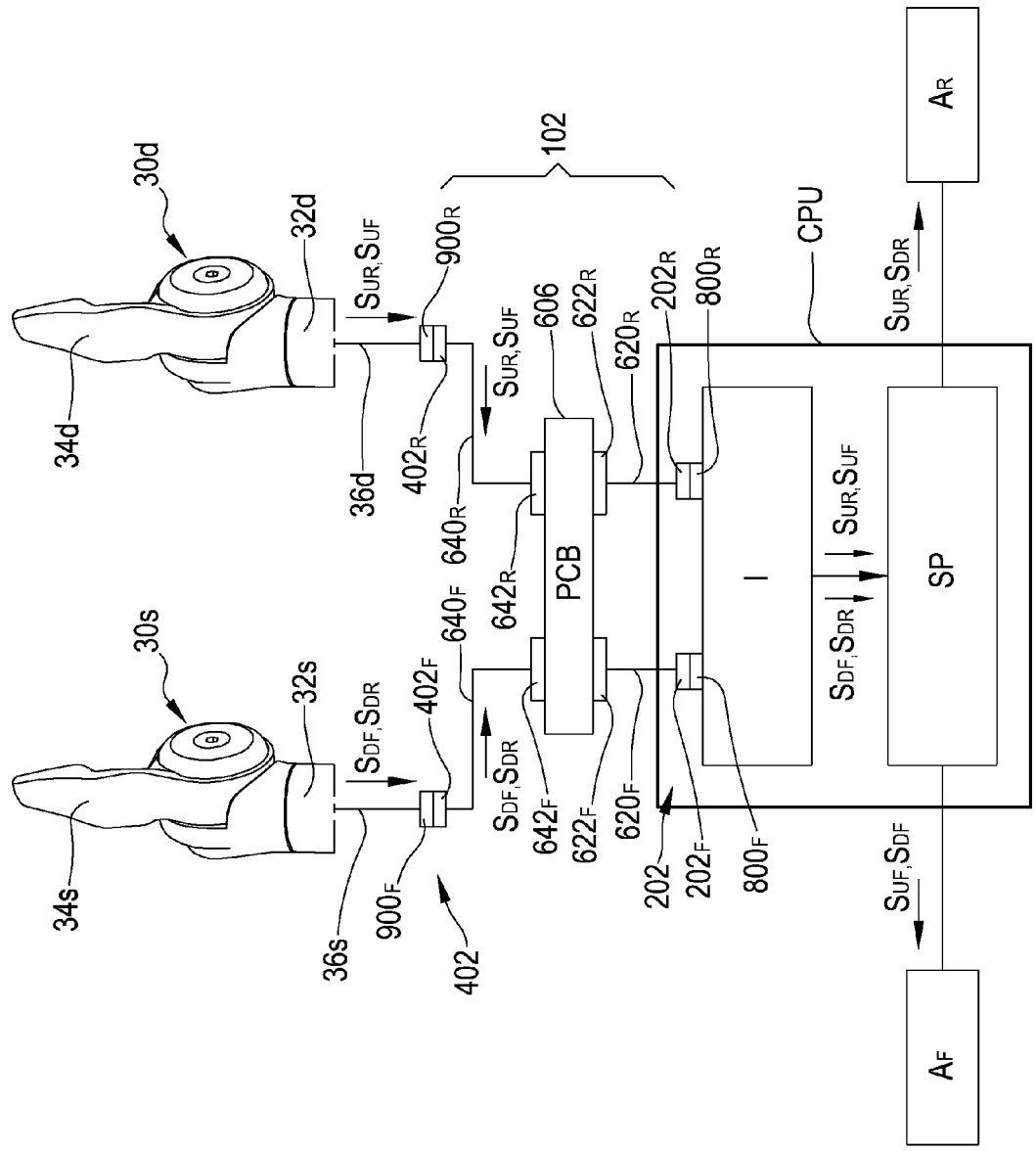
FIG. 11 is a schematic representation of yet another embodiment of the command inverter, alternative to that of FIG. 6 and of its mode of connection to the pair of gearshift control devices and to the electronic gearshifting control unit.

FIG. 11 shows a command inverter according to a fifth embodiment, indicated in general with reference numeral 102, and the mode of electrical connection thereof between a pair of right and left gearshift control devices 30d, 30s and the electronic gearshifting control unit CPU.

The command inverter 102 comprises a first interface 202 for electrical connection to the electronic gearshifting control unit CPU and a second interface 402 for electrical connection with a pair of gearshift control devices 30d, 30s mounted on the right and left of the handlebars of the bicycle. The second interface 402 is totally similar to the second interface 400 of the command inverter 100 of FIG. 6 and comprises a first main body $402_R$ and a second main body $402_F$ for coupling, respectively, with connectors $900_R$ and $900_F$ of the right and left gearshift control devices 30d and 30s. The first interface 202 differs from the first interface 200 of the command inverter 100 in that it comprises a first main body $202_R$ and a second main body $202_F$ for coupling with connectors $800_D$ and $800_R$ of the interface I of the electronic gearshifting control unit CPU.

Connections between the electrical terminations of the first interface 202 and connectors $800_R$, $800_F$ and connections between the electrical terminations of the second interface 402 and connectors $900_R$, $900_F$ of the right and left control devices 30d, 30s are totally similar to those described for the command inverter 100, and thus they will not be further illustrated. Between the first and the second interface 202 and 402 of the command inverter 102 a printed circuit board 606 is arranged, comprising a plurality of tracks (not shown), which acts as a means of electrical connection between the first interface and the second interface 202 and 402 of the command inverter 102.

In particular, the printed circuit board 606 is connected to the first interface 202 of the command inverter 102 by means of a first pair of multiconductor cables $620_R$ and $620_F$, each equipped with a respective connector $622_F$ and $622_R$ for electrical connection to the printed circuit board 606. The printed circuit board 606 is also connected to the second interface 402 of the command inverter 202 by means of a second pair of multiconductor cables $640_R$, $640_F$, each equipped with a respective connector $642_F$ and $642_R$ for electrical connection to the printed circuit board 606.

The arrangement of tracks inside the printed circuit board 606 is such as to make the inversion of the commands according to the connection scheme of FIG. 7.

The various connectors of the embodiments described above and illustrated in the Figures are preferably air-tight.

A man skilled in the art will recognise that it is possible to combine the various characteristics of the embodiments described above to obtain further embodiments, all in any case covered by the scope of the present invention as defined by the following claims.

For example, although by means of the command inverter device of the various illustrated embodiments an inversion is carried out between the commands of a pair of commands or of two pairs of commands, it is possible, by changing the electrical connections between the terminations of the first interface and the terminations of the second interface, to carry out an inversion between the commands of more than two pairs of commands. For example, it is possible to carry out the upward gearshifting of the rear and front derailleur by lifting and lowering the right control lever as stated above, but the downward gearshifting of the rear and front derailleur by lowering and lifting the left control lever.

The inverted/modified commands can comprise, as an alternative or in addition, also one or more MODE/SET commands.

In addition to reverse commands of a pair of commands from time to time, it is also possible to change the mode of manual input between three or more commands. For example, when a first, a second and a third switch are controlled by respective levers or buttons configured to enter into the CPU a first, a second and a third command, respectively, in the absence of the command inverter device, an electrical connection between the terminations of the first interface and those of the second interface can be made in the command inverter device such that the commands generated through the first, second and third switch are the second, the third and the first command, respectively.

Moreover, the control inverters of the invention are equally applicable to any type of gearshift, like for example a semi-automatic gearshift and, as stated above, also to controls not of the bar-end type. Furthermore, although a mode of connection through removable connectors between the command inverter and the electronic gearshifting control unit, on the one hand, and one or two gearshift control devices, on the other hand, has been described and illustrated, it is possible to provide any similar mode of connection, within the capabilities of the man skilled in the art.

The male electrical terminations do not necessarily have to be made projecting inside cavities of the main bodies as shown.

The connectors shown as directly associated with the CPU and with the controls can, on the other hand, be made at the end of respective cables removably connected to the CPU and to the controls, for example to facilitate the assembly of the various parts of the gearshift on the frame of the bicycle.

As stated above, in addition to be applicable to a pair of control devices suitable for each imparting the command signals of a respective derailleur, the command inverter is applicable to a single control device suitable for imparting control signals of the change of the transmission ratio, suitably converted by the CPU into upward and/or downward gearshifting signals of one or both of the derailleurs. Moreover, the command inverter is applicable to gearshifts having just the rear derailleur or just the front derailleur.

The command inverter of FIGS. 1-5 can thus be commercialised by itself or in a kit of two inverters; in the kit one or two controls can also be present; the command inverter of FIGS. 6-11 can be commercialised in a kit with two controls.

It is also possible to commercialise kits of many inverters having different connections between terminations of the first interface and those of the second interface, between which the cyclist can choose to obtain the configuration most suited to his needs and preferences.

What is claimed is:

1. Command inverter for at least one bicycle gearshift control device, the inverter comprising:
a first interface with an electronic gearshifting control unit, said first interface comprising a plurality of electrical terminations;
a second interface with said at least one gearshift control device, said second interface comprising a plurality of electrical terminations matching with and corresponding to the electrical terminations of the first interface;
wherein at least one electrical termination of the first interface is not electrically connected to a corresponding electrical termination of the second interface.

2. Command inverter according to claim 1, wherein at least one electrical termination of the first interface is electrically connected to a corresponding electrical termination of the second interface.

3. Command inverter according to claim 1, wherein said at least one electrical termination of the first interface that is not electrically connected to a corresponding electrical termination of the second interface comprises a subplurality of electrical terminations of the first interface that are electrically connected to a corresponding subplurality of electrical terminations of the second interface.

4. Command inverter according to claim 3, wherein said subplurality of electrical terminations of the first interface and said subplurality of electrical terminations of the second interface each comprise a pair of electrical terminations.

5. Command inverter according to claim 1, wherein said first interface is configured to couple with a connector of the electronic gearshifting control unit and said second interface is configured to couple with a connector of one manual gearshift control device.

6. Command inverter according to claim 1, wherein the electrical terminations of said first interface are housed in a first main body, the electrical terminations of said second interface are housed in a second main body and in a possible third main body, and the electrical terminations of the first and second interface are connected through conducting wires of a multiconductor cable, possibly branched.

7. Command inverter according to claim 1, wherein the electrical terminations of said first and second interface are housed at distinct faces of a container body, and the electrical terminations of the first and second interface are connected through conductive rods or foils extending within the container body.

8. Command inverter according to claim 1, wherein said first interface is configured to couple with a first and a second connector of the electronic gearshifting control unit, and said second interface is configured to couple with a connector of a right manual control device and with a connector of a left manual control device.

9. Command inverter according to claim 1, wherein a first subplurality of electrical terminations of said first interface is configured to couple with a first connector of the electronic gearshifting control unit, a second subplurality of electrical terminations of said first interface is configured to couple with a second connector of the electronic gearshifting control unit, a first subplurality of electrical terminations of the second interface is configured to couple with a connector of a right manual control device, and a second subplurality of electrical terminations of the second interface is configured to couple with a connector of a left manual control device.

10. Command inverter according to claim 9, wherein said at least one electrical termination of the first interface that is not electrically connected to a corresponding electrical termination of the second interface comprises at least one electrical termination of the first subplurality of electrical terminations of the first interface that is electrically connected to at least one electrical termination of the second subplurality of electrical terminations of the second interface, and at least one electrical termination of the second subplurality of electrical terminations of the first interface that is electrically connected to at least one electrical termination of the first subplurality of electrical terminations of the second interface.

11. Command inverter according to claim 10, wherein at least one electrical termination of the first subplurality of electrical terminations of the first interface is electrically connected to at least one electrical termination of the first subplurality of electrical terminations of the second interface, and at least one electrical termination of the second subplurality of electrical terminations of the first interface is electrically connected to at least one electrical termination of the second subplurality of electrical terminations of the second interface.

12. Command inverter according to claim 1, wherein the electrical terminations of said first interface are housed in a first main body and in a second main body, the electrical terminations of said second interface are housed in a third main body and in a fourth main body, and the electrical terminations of the first and of the second interface are connected through a printed circuit board connected to said main bodies through respective multi-conductor cables.

13. Command inverter according to claim 1, wherein said plurality of electrical terminations of the first interface and said plurality of electrical terminations of the second interface are arranged in the respective interfaces so as to univocally define the correspondence among the electrical terminations of the first interface and the electrical terminations of the second interface and/or in a respective shaped portion of at least one main body so as to univocally define the correspondence among the electrical terminations of the first interface and the electrical terminations of the second interface.

14. Kit of parts comprising at least one command inverter according to claim 1, and optionally one or two manual gearshift control devices.

* * * * *